(12) United States Patent
Downie et al.

(10) Patent No.: US 9,594,223 B2
(45) Date of Patent: Mar. 14, 2017

(54) OPTO-ELECTRICAL CONNECTION SYSTEMS INCLUDING OPTO-ELECTRICAL CABLES PROVIDING CONFIGURABLE CONNECTIVITY BETWEEN ELECTRICAL DEVICES HAVING ELECTRICAL INTERFACES, AND RELATED ASSEMBLIES AND METHODS

(71) Applicant: CORNING INCORPORATED, Corning, NY (US)

(72) Inventors: John David Downie, Painted Post, NY (US); Davide Domenico Fortusini, Ithaca, NY (US); James Patrick Trice, Corning, NY (US); Richard Edward Wagner, Painted Post, NY (US); Hejie Yang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/727,955

(22) Filed: Jun. 2, 2015

(65) Prior Publication Data
US 2015/0260934 A1 Sep. 17, 2015

Related U.S. Application Data

(63) Continuation of application No. PCT/US2013/072754, filed on Dec. 3, 2013.
(Continued)

(51) Int. Cl.
*G02B 6/43* (2006.01)
*G02B 6/42* (2006.01)
(Continued)

(52) U.S. Cl.
CPC .......... *G02B 6/43* (2013.01); *G02B 6/3546* (2013.01); *G02B 6/4246* (2013.01);
(Continued)

(58) Field of Classification Search
CPC ...... G02B 6/43; G02B 6/4246; G02B 6/3546; G02B 6/4292; G02B 6/4416; G02B 6/4293; H04B 10/25; H04B 10/2503; H04B 10/801
(Continued)

(56) References Cited

U.S. PATENT DOCUMENTS

| | | | |
|---|---|---|---|
| 6,714,698 B2 * | 3/2004 | Pfeiffer | H04Q 1/24 385/134 |
| 2006/0067690 A1 * | 3/2006 | Tatum | H04N 7/22 398/66 |

(Continued)

FOREIGN PATENT DOCUMENTS

| | | | |
|---|---|---|---|
| CN | 102200717 A | 9/2011 | ........... G03G 15/043 |
| CN | 102201866 A | 9/2011 | ............. H04B 10/12 |

(Continued)

OTHER PUBLICATIONS

Cost optimization of optical in-building networks, A. M. J. Koonen et al., Optics Express, vol. 19, No. 26, Dec. 12, 2011, 7 pages.
(Continued)

*Primary Examiner* — Ryan Lepisto

(57) ABSTRACT

Opto-electrical connection systems including opto-electrical cables providing configurable connectivity between electrical devices having electrical interfaces are disclosed. Related assemblies and methods are also disclosed. By using configurable connection assemblies having at least one configurable connection device adapted to accept optical connectors of optical fibers of opto-electrical cables, many electrical devices having electrical interfaces may be con- (Continued)

figurably connected. For example, the configurable optoelectrical connection system may be configured to provide more bandwidth and/or connect electrical devices with less power consumption than would be associated with conventional copper cabling solutions. In this manner, the high bandwidth, lower power consumption, and long distance signal capability of optical fibers may be provided to connect electronic devices which were originally designed with electrical interfaces meant to be connected with copper cables.

33 Claims, 16 Drawing Sheets

Related U.S. Application Data

(60) Provisional application No. 61/734,173, filed on Dec. 6, 2012.

(51) Int. Cl.
  *G02B 6/35* (2006.01)
  *H04B 10/80* (2013.01)
  *H04B 10/25* (2013.01)
  *G02B 6/44* (2006.01)

(52) U.S. Cl.
  CPC ......... *G02B 6/4292* (2013.01); *G02B 6/4293* (2013.01); *G02B 6/4416* (2013.01); *H04B 10/25* (2013.01); *H04B 10/801* (2013.01)

(58) Field of Classification Search
  USPC .................................................. 385/89, 135
  See application file for complete search history.

(56) References Cited

U.S. PATENT DOCUMENTS

| | | | |
|---|---|---|---|
| 2007/0058976 A1 | 3/2007 | Tatum et al. | 398/99 |
| 2007/0233906 A1 | 10/2007 | Tatum et al. | 710/26 |
| 2007/0237462 A1* | 10/2007 | Aronson | G02B 6/4292 385/89 |
| 2007/0237470 A1 | 10/2007 | Aronson et al. | 385/101 |
| 2007/0237471 A1 | 10/2007 | Aronson et al. | 385/101 |
| 2008/0152290 A1* | 6/2008 | Graff | G02B 6/4452 385/135 |
| 2011/0206327 A1 | 8/2011 | Chen | 385/88 |

FOREIGN PATENT DOCUMENTS

| | | | |
|---|---|---|---|
| JP | 7-250367 | 9/1995 | H04Q 7/22 |
| JP | 2004-241361 A | 8/2004 | H01B 11/22 |
| WO | WO2008/127336 A1 | 10/2008 | G02B 6/42 |
| WO | WO2009/038572 A1 | 3/2009 | G02B 6/44 |

OTHER PUBLICATIONS

Recent Progress in Optical Access and Home Networks: Results from the Alpha Project, Mikhail Popov, ECOC Technical Digest, We.7.C.2, Jul. 27, 2011, 3 pages.

Simultaneous implementation of Gigabit Ethernet, RF TV and radio mm-wave in a multiformat Home Area Network, Joffray Guillory et al., ECOC Technical Digest, We.7.C.3, Jul. 27, 2011, 3 pages.

International Search Report and Written Opinion issued corresponding PCT Application No. PCT/US2013/072754, issued Apr. 29, 2014.

\* cited by examiner

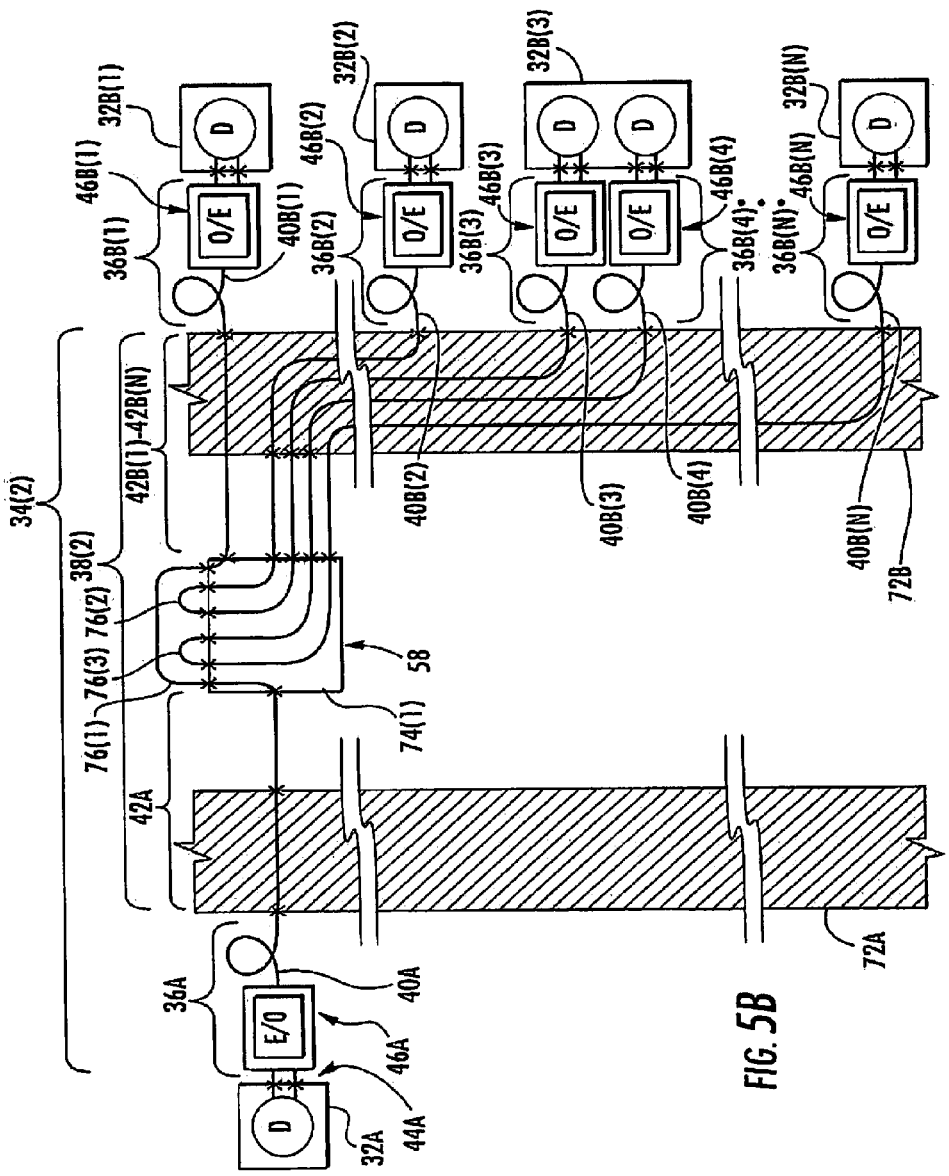

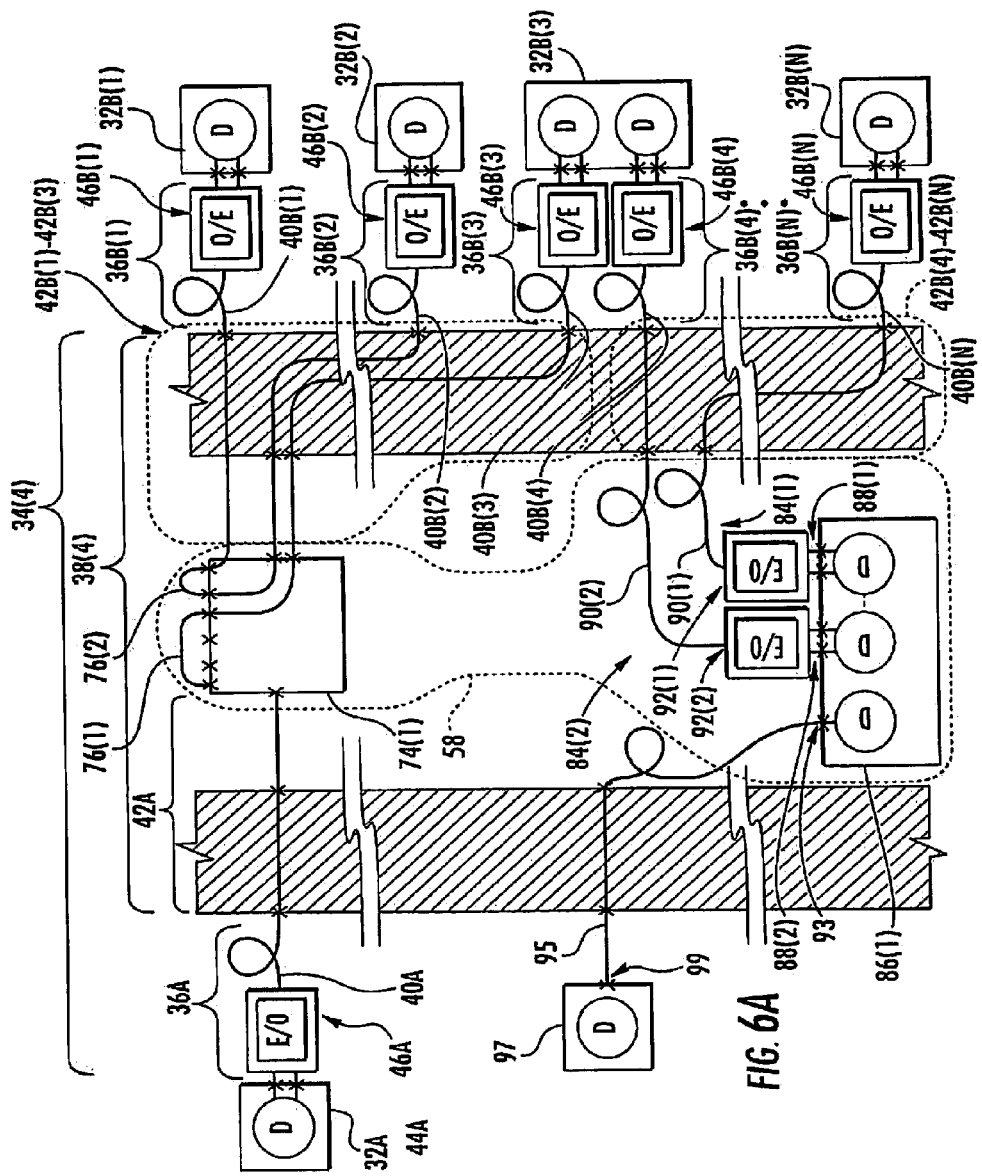

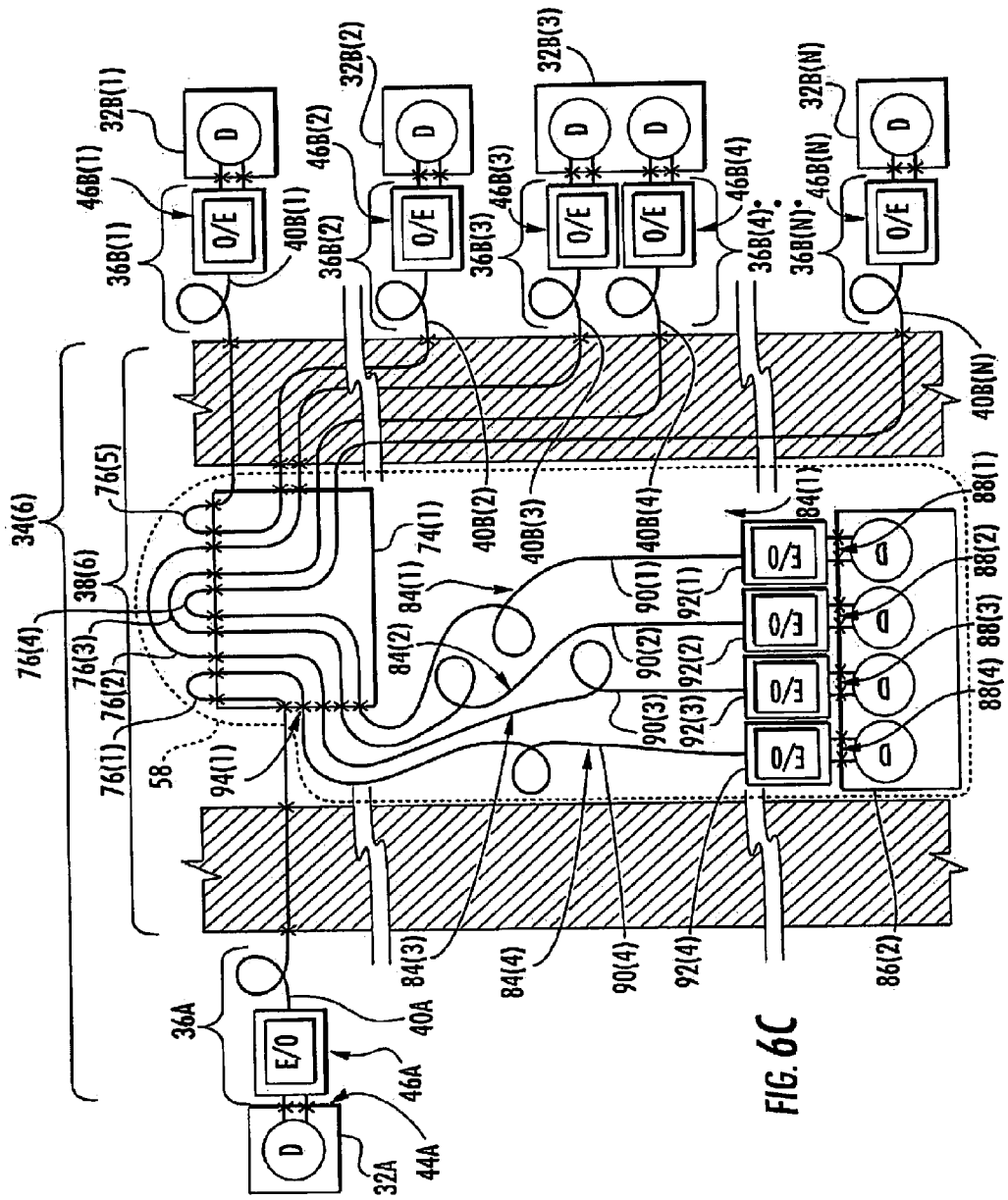

OPTO-ELECTRICAL CONNECTION SYSTEMS INCLUDING OPTO-ELECTRICAL CABLES PROVIDING CONFIGURABLE CONNECTIVITY BETWEEN ELECTRICAL DEVICES HAVING ELECTRICAL INTERFACES, AND RELATED ASSEMBLIES AND METHODS

PRIORITY APPLICATIONS

This application is a continuation of International Application No. PCT/US13/72754, filed Dec. 3, 2013, which claims the benefit of priority to U.S. Application No. 61/734,173, filed Dec. 6, 2012, both applications being incorporated herein by reference.

FIELD

The technology of the disclosure relates to information transfer between electrical devices having electrical interfaces using opto-electrical cables.

TECHNICAL BACKGROUND

As connection line speeds increase, to rates as high as five (5) to ten (10) Gigabits per second (Gb/s), and beyond, active optical cables (AOCs) are increasingly being used as an alternative to traditional copper cables. Active optical cables allow electrical signals to be converted and carried as optical signals over optical fiber. Benefits of utilizing optical fiber include extremely wide bandwidth and high immunity to environmental electronic noise. There also may be a power consumption advantage to using active optical cables for connecting electrical devices across distances greater than ten (10) meters because the power required by the active optical cables to convert the signals between the electrical and optical domains is less than the power consumption required to transmit high bandwidth data with copper cables.

In this regard, FIG. 1 illustrates an exemplary active optical cable 10 including end connectors 12A, 12B. Each end connector 12A, 12B may include electrical conductor inputs 14A configured to receive input electrical signals and electrical conductor outputs 14B configured to provide output electrical signals. Opto-electronic transceivers 16A, 16B may be included within end connector housings 18A, 18B for each of the end connectors 12A, 12B, respectively. The opto-electronic transceivers 16A, 16B each may include transmitter optical sub-assemblies (TOSAs) (not shown) that receive electrical input signals from the electrical conductor inputs 14A and convert the received electrical input signals into optical signals to be transmitted over optical fiber 15. The opto-electronic transceivers 16A, 16B may also each include receiver optical sub-assemblies (ROSAs) (not shown) that convert the optical signals transmitted over the optical fiber 15 back into electrical signals to be provided as electrical output signals on the electrical conductor outputs 14B.

Although active optical cabling is available, copper twisted pair cabling ("copper cables"), for example Category 5 cables or Category 6 cables have been commonly used to provide interconnections between electrical devices within buildings, campuses, and facilities where distances are short enough to facilitate low frequency communications. Copper twisted pair cabling becomes less attractive when used for higher signal frequencies and longer cable distances because of the impedance of the cable, which increases with distance. However, through the use of mid-span electrical amplifiers and repeaters, copper twisted pair cables may provide reliable interconnectibility options between electrical devices for accurate signal transfer.

As the reliability of copper twisted pair cabling is well-known and is widely used, significant infrastructure investments have been made, for example, to develop, procure and install complex copper-based switching devices capable of interconnecting a wide range of electrical devices in interconnection configurations. Electrical interfaces including power and electrical signal capability compatible with standard protocols, for example, HDMI, are well-established and have been adapted to the interconnection configurations which may be used in data centers to deliver voice, video, and data transmissions to subscribers over both private and public networks. For example, active optical cables can support connections between servers, storage area networks (SANs), and/or other equipment in data centers.

As the demand for bandwidth to interconnect devices increases at or above 10 Gb/s, for cable distances spanning more than ten (10) meters there is a need to reduce power consumption by avoiding electrical amplifiers or repeaters which are normally used in copper cables. As the majority of the electrical devices have electrical interfaces to be compatible with copper cables and the electrical devices are expensive to replace, any new interconnection installations need to be compatible with the electrical interfaces of the existing electrical devices. Active optical cables fulfill the power consumption and interface compatibility requirements needed for interconnectability of electrical devices but currently lack the ability to form complex interconnection configurations as are currently possible with copper cables. Active optical cables would also need to be flexible so as to support the required connectivity even though the electrical devices may be replaced by upgraded equipment over time.

What is needed is a system or method to connect electrical devices in a highly-configurable manner so that the interconnection and transmission of the electrical signals among those electrical devices can accommodate the high bandwidth and lower power consumption requirements of the electrical devices.

SUMMARY

Embodiments disclosed herein include opto-electrical connection systems including opto-electrical cables providing configurable connectivity between electrical devices having electrical interfaces. Related assemblies and methods are also disclosed. By using configurable connection assemblies having at least one configurable connection device adapted to accept optical connectors of optical fibers of opto-electrical cables, many electrical devices having electrical interfaces may be configurably connected. For example, the configurable opto-electrical connection system may be configured to provide more bandwidth and/or connect electrical devices with less power consumption than would be associated with conventional copper cabling solutions. In this manner, the high bandwidth, lower power consumption, and long distance signal capability of optical fibers may be provided to connect electronic devices which were originally designed with electrical interfaces meant to be connected with copper cables.

In this regard, an opto-electrical connection system is provided. The opto-electrical connection system comprises an opto-electrical cable including at least one optical fiber including a first end and a second end opposite the first end configured to carry signals in an optical domain between the first end and the second end. The opto-electrical cable may also include an opto-electrical connector assembly having an opto-electrical converter configured to convert the signals between the optical domain and the electrical domain, the opto-electrical converter may be configured to exchange the signals between an electrical interface of an electrical device and the first end of the at least one optical fiber. The opto-electrical connection system may also include a configurable connection assembly including an optical interface accepting at least one optical connector of the at least one optical fiber of the opto-electrical cable. The opto-electrical connection system may also include at least one second optical interface adapted to accept at least one second optical connector of at least one second optical fiber of at least one second opto-electrical cable. The opto-electrical connection system may also include a configurable connection device to interconnect the signals between the second end of the at least one optical fiber of the opto-electrical cable and the at least one second optical fiber of the at least one second opto-electrical cable. In this way, multiple electrical devices having electrical interfaces may be efficiently connected, disconnected and reconfigured.

In another embodiment, a method for optically connecting electronic devices is provided. The method may comprise electrically coupling an opto-electrical cable with an electrical interface of an electronic device. The method may also comprise electrically coupling at least one second opto-electrical cable with at least one second electrical interface of at least one second electronic device. The method may also include optically connecting at least one optical fiber of the opto-electrical cable at an optical interface of the configurable connection assembly. The method may also comprise optically connecting at least one second optical fiber of at least one second opto-electrical cable with at least one second optical interface of the configurable connection assembly. In this manner, the electrical device and the at least one second electrical device may be separated by a longer distance than when connected with merely copper cables.

In another embodiment, a configurable connection assembly (CCA) is provided. The CCA may comprise an optical interface adapted to accept at least one optical connector of at least one optical fiber of an opto-electrical cable. The CCA may also include at least one second optical interface adapted to accept at least one second optical connector of at least one second optical fiber of at least one second opto-electrical cable. The CCA may also include a configurable connection device to interconnect signals in an optical domain between the at least one optical fiber of the opto-electrical cable and the at least one second optical fiber of the at least one second opto-electrical cable. In this manner, connections between the electrical device and the at least one second device may be highly configurable.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 5A and 5B are schematic diagrams of the electrical device of FIG. 2 being connected in two connectivity configurations, respectively, to the at least one second electrical devices via one embodiment of an opto-electrical connection system comprising a configurable connection device of the configurable connection assembly, illustrating that the configurable connection device may include a patch panel;

FIG. 6A is a schematic diagram of the electrical device of FIG. 2 being connected by another opto-electrical connection system including the patch panel of FIG. 5A and a matrix switch, illustrating another connectivity configuration embodiment of the opto-electrical connection system and also an electrical interface available for electrical coupling to a copper cable;

FIG. 6C is a schematic diagram of the electrical device of FIG. 2 being connected by another opto-electrical connection system including the patch panel of FIG. 5A and the matrix switch having the plurality of ports in the matrix switch connected to the patch panel, illustrating another connectivity configuration embodiment of the opto-electrical connection system;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include opto-electrical connection systems including opto-electrical cables providing configurable connectivity between electrical devices having electrical interfaces. Related assemblies and methods are also disclosed. By using configurable connection assemblies having at least one configurable connection device adapted to accept optical connectors of optical fibers of opto-electrical cables, many electrical devices having electrical interfaces may be configurably connected. For example, the configurable opto-electrical connection system may be configured to provide more bandwidth and/or connect electrical devices with less power consumption than would be associated with conventional copper cabling solutions. In this manner, the high bandwidth, lower power consumption, and long distance signal capability of optical fibers may be provided to connect electronic devices which were originally designed with electrical interfaces meant to be connected with copper cables.

Figure 1:
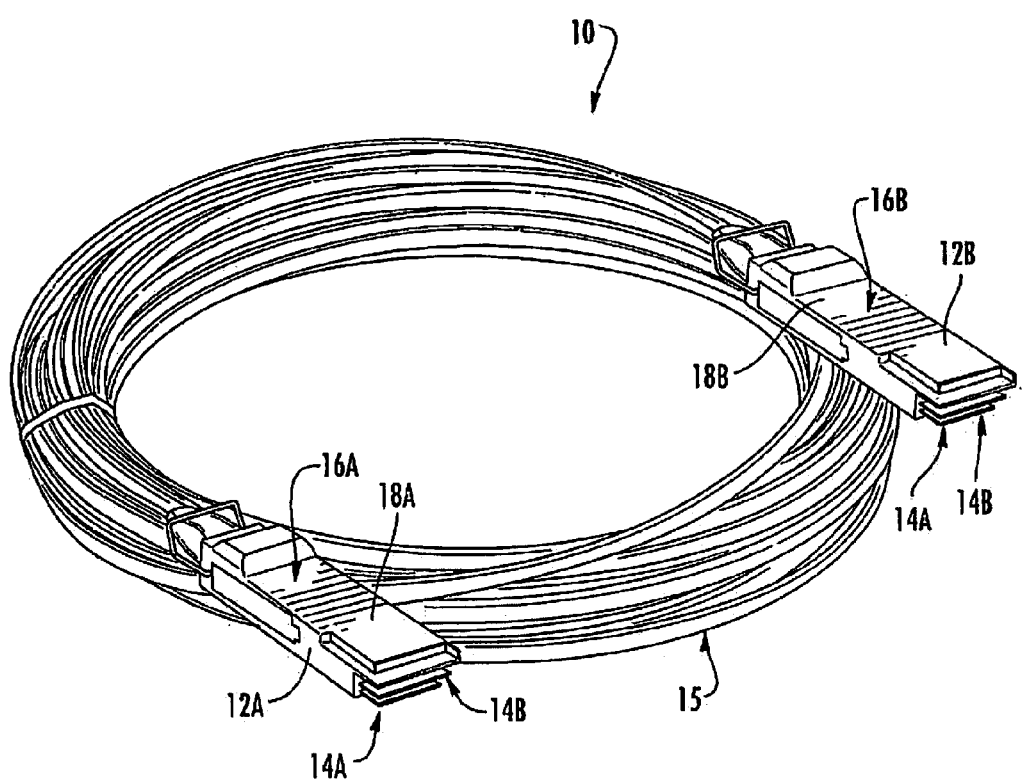
FIG. 1 is an exemplary active optical cable (AOC) that employs opto-electrical connector assemblies having electrical conductor inputs and electrical conductor outputs, electrical-to-optical (E-O) converters to convert and carry electrical input signals as optical signals over optical fiber, and optical-to-electrical (O-E) converters to convert the carried optical signals back into electrical output signals, illustrating one option of connecting two electrical interfaces of electronic devices as a comparative example.
Figure 2:
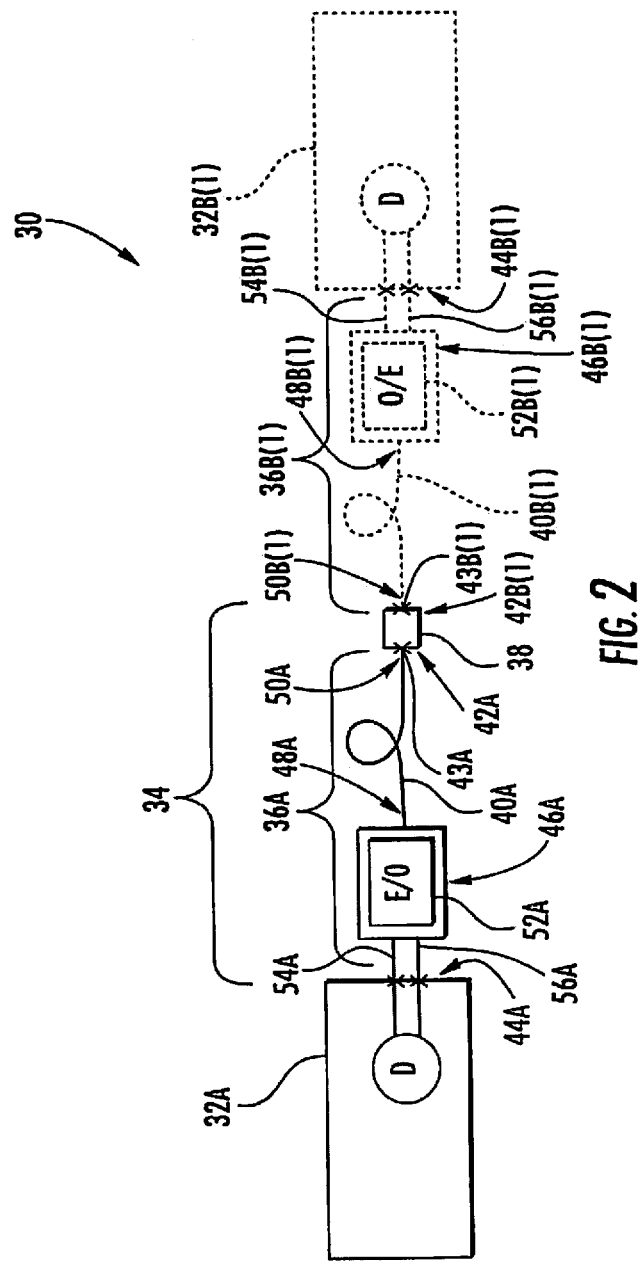
FIG. 2 is a schematic diagram of an exemplary connection strategy configuration for an exemplary electrical device connected to an exemplary opto-electrical connection system which enables further connectivity to at least one second electronic device via at least one second opto-electric cable, illustrating the components of the opto-electrical connection system including an opto-electrical cable and a configurable connection assembly (CCA)

In this regard in embodiments disclosed herein, electrical devices may be connected using an opto-electrical connection system which facilitates highly-configurable opto-electrical connections between the electrical devices. The opto-electrical connection system uses at least one optical fiber as part of opto-electrical cables to facilitate low power consumption, high bandwidth, and long-distance signal propagation capability. The opto-electrical connection system may also include opto-electrical connector assemblies having opto-electrical converters to convert signals between the optical and electrical domains to provide compatibility with electrical interfaces of electrical devices. In FIGS. 2 through 3D the general concepts of using an opto-electrical connection system including a configurable connection assembly will be introduced to provide a highly-configurable connection scheme between electrical devices. Then, more specific embodiments of opto-electrical connection systems will be discussed relative to FIGS. 5A through 7C.

FIG. 2 depicts a schematic diagram of an exemplary connection configuration 30 including an exemplary electrical device 32A connected to an exemplary opto-electrical connection system 34 which enables highly-configurable connectivity configurations to meet the needs of users. For example, the electrical device 32A in a most fundamental configuration may be connected with at least one second electrical device 32B(1) through the opto-electrical connection system 34. Before mentioning the flexibility of connecting other second electrical devices 32B(1)-32B(N) to the electrical device 32A via the opto-electrical connection system 34, details of the opto-electrical connection system 34 will be introduced first.

As mentioned above, the opto-electrical connection system 34 may enable the electrical device 32A to be conveniently connected with at least one second electrical device 32B. The opto-electrical connection system 34 may include an opto-electrical cable 36A and a configurable connection assembly (CCA) 38. Each of these will now be discussed in detail.

The opto-electrical cable 36A may be configured to carry signals between an optical interface 42A of the CCA 38 and an electrical interface 44A of the electrical device 32A. The electrical interface 44A may be, for example, compatible with common electronic formats used in consumer electronics, for example, high-definition multimedia interface (HDMI) standards, USB, eSATA, PCIe, DisplayPort, and/or Ethernet standards. Since consumer electronic devices use a variety of very common electronic formats, the opto-electrical connector assembly 46A may be configured to be compatible with many multiple electronic formats, and to recognize the electronic format used by the electrical interface 44A of the electrical device 32A and automatically negotiate with the electrical interface 44A to determine automatically which electronic format may be utilized by the electrical interface 44A to provide interconnection. For example, the opto-electrical connector assembly 46A could support both HDMI interfaces (with 6 Gb/s signals) and 10-gigabit Ethernet interfaces (with 10 Gb/s signals), with the capability to automatically select which of the two electronic formats to utilize. For example, when the opto-electrical connector assembly 46A may be interconnected to the electrical device 32A which may be an HDMI compliant device, then the second opto-electrical connector assemblies 46B(1)-46B(N) would then detect and adopt the HDMI electronic format. As a further exemplary situation, if the opto-electrical connector assembly 46A were unplugged from the electrical device 32A which may be configured to be HDMI compliant. Then if the opto-electrical connector assembly 46A were subsequently plugged into another electrical device 32A' (not shown) which is an Ethernet compliant device, then the second opto-electrical connector assembly 46B(1)-46B(N) interconnected to the electrical device 32A' would detect the Ethernet electronic format and adopt the Ethernet electronic format. In this manner, a single design of the opto-electrical connector assembly 46A of the opto-electrical cable 36A may accommodate multiple electronic formats, and the connectivity in the interconnection with the electronic interface 44A of the electrical device 32A may be automatically established without the user remembering or recording which of the opto-electrical cable 36A and/or the second opto-electrical cables 36B(1)-36B(N) are connected to which electronic formats. It is noted that the second opto-electrical cables 36B(1)-36B(N) and the optoelectrical cable 36A may share the same features in relation to detecting and adopting electronic formats.

The at least one optical fiber 40A may include a first end 48A and a second end 50A opposite the first end 48A. In one embodiment, the at least one optical fiber 40A includes two (2) multimode optical fibers.

The at least one optical fiber 40A could contain various numbers of fibers, including one (1), two (2), or more fibers. If the at least one optical fiber 40A contains only one (1) optical fiber it is advantageous for that one (1) optical fiber to carry transmission signals in both directions on the same fiber. Accordingly, the opto-electrical connector assembly 46A at each end may accommodate optical interconnectivity into one (1) optical fiber. The at least one optical fiber 40A could be either at least one multimode optical fiber or at least one single-mode optical fiber. The at least one opto-electrical cable 36A may include the at least one optional electrical power wire 41A in the cable to carry electrical power from the opto-electrical connector assembly 46A to the CCA 38 where the electrical power may be distributed to one or more of the second optional electrical power wires 41B(1)-41B(N) (FIG. 3A) to provide electrical power to the at least one second opto-electrical converter 52B(1)-52B(N) of the second opto-electrical connector assembly 46B(1)-46B(N).

The at least one optical fiber 40A may be configured to carry signals in an optical domain between the first end 48A and the second end 50A. The first end 48A of the at least one optical fiber 40A may be adjacent to the opto-electrical connector assembly 46A and may exchange the signals in the optical domain with the opto-electrical connector assembly 46A. The second end 50A of the optical fiber 40A may be optically connected with the CCA 38 and may include an optical connector 43A adapted to be accepted by the optical interface 42A of the CCA 38. It is noted that the optical connector 43A may comprise one or more optical connectors, such as those currently used for simplex, duplex, and multi-array fiber connections. For example, the optical connector 43A may comprise a standard optical connector type, for example, a Corning® Unicam® SC fiber connector made by Corning Incorporated of Corning, N.Y.

It is noted that the at least one optical fiber 40A may be a single-mode or multimode optical fiber comprising, for example, silica. The at least one optical fiber 40A may, for example, have a nominal diameter of one-hundred twenty-five (125) microns and may include a protective coating (not shown). Other nominal diameters may also be used. The at least one optical fiber 40A may also be protected by a cable jacket (not shown). The at least one optical fiber 40A may be, for example, Corning® Clearcurve® optical fiber made by Corning Incorporated of Corning, N.Y.

As discussed above, the opto-electrical cable 36A also includes the opto-electrical connector assembly 46A. The opto-electrical connector assembly 46A may be configured to carry the signals between the first end 48A of the at least one optical fiber 40A and the electrical interface 44A of the electrical device 32A. The opto-electrical connector assembly 46A may include an opto-electrical converter 52A configured to convert the signals between the optical domain compatible with the at least one optical fiber 40A and the electrical domain compatible with the electrical interface 44A of the electrical device 32A. The opto-electrical converter 52A may comprise one or more of at least one electrical-to-optical (E-O) converter (not shown) to convert signals in the electrical domain from the electrical interface 44A to signals in the optical domain to be transferred to the at least one optical fiber 40A. The opto-electrical converter 52A may also include optical-to-electrical (O-E) converters to convert the signals in the optical domain from the optical fiber 40A to signals in the electrical domain to be transferred to the electrical interface 44A. In one embodiment, the opto-electrical converter 52A may, for example, include VCSEL sources with p-i-n diode photodiodes detectors, and an LC duplex optical connector as an optical interconnection. It is noted that DFB or DBR lasers could be used, for example, instead of VCSEL sources. Also, avalanche photodiodes could be used instead of p-i-n diodes.

With continued reference to FIG. 2, the opto-electrical connector assembly 46A of the opto-electrical cable 36A may include at least one electrical conductor input MA and at least one electrical conductor output 56A to engage and exchange the signals in the electrical domain with the electrical interface 44A of the electrical device 32A. The electrical conductor input MA may also provide power from the electrical interface 44A of the electrical device 32A to facilitate operation of the opto-electrical converter 52A.

As discussed above, the opto-electrical connection system 34 includes the opto-electrical cable 36A and the CCA 38. Now that the details of the opto-electrical cable 36A have been discussed, details of the CCA 38 are now provided. As is depicted in FIG. 2, the CCA 38 may include at least one second optical interface 42B(1) adapted to accept at least one second optical connector 43B(1) of at least one second optical fiber 40B(1) of at least one second opto-electrical cable 36B(1). As will be discussed in more detail below, the CCA 38 may include, for example, trunk cables, a patch panel, one or more jumper cables, an optical switch, multi-fiber trunk cables, fan-out assemblies, wall plate receptacles, and cable management structures to provide physical support to the structured cabling components and to ease the installation of the structured cabling infrastructure. In this manner, the second electrical device 32B(1) may be interconnected with the CCA 38 and be available to be interconnected to the electrical device 32A.

It is noted that the jumper cables may be interconnected with one or more optical connectors, such as those currently used for simplex, duplex, and multi-array fiber connections. In one embodiment, the optical connector 43A may be interconnected on the various structured cabling components would be terminated in the factory, but under some circumstances it would be desirable to be able to terminate these connectors in the home or environment where the network cables are installed. For specific applications such as outdoors or in an industrial environment, an optical termination specifically designed for harsh environments could be used in place of the LC connector; for example an environmentally-sealed optical connector or a connector using lenses to expand the size of the optical beam to reduce the sensitivity to contamination.

Many components may be interconnected at the at least one second optical interface 42B(1) of the CCA 38. FIG. 2 illustrates the second opto-electrical cable 36B(1) may be interconnected at the second optical interface 42B(1).

The second opto-electrical cable 36B(1) may be configured to carry signals between the second optical interface 42B(1) of the CCA 38 and the second electrical interface 44B(1) of the second electrical device 32B(1). The second electrical interface 44B(1) may be, for example, compatible with common electrical standards used in consumer electronics, for example, HDMI standards, USB, eSATA, PCIe, DisplayPort, and/or Ethernet standards. The second opto-electrical cable 36B(1) may include at least one second optical fiber 40B(1) and a second opto-electrical connector assembly 46B(1).

The at least one second optical fiber 40B(1) may include a first end 48B(1) and a second end 50B(1) opposite the first end 48B(1). In one embodiment, the at least one second optical fiber 40B(1) includes two (2) multimode optical fibers. The at least one second optical fiber 40B(1) may be configured to carry signals in an optical domain between the first end 48B(1) and the second end 50B(1). The first end 48B(1) of the at least one second optical fiber 40B(1) may be adjacent to the second opto-electrical connector assembly 46B(1) and may exchange the signals in the optical domain with the second opto-electrical connector assembly 46B(1). The second end 50B(1) of the second optical fiber 40B(1) may be optically connected with the CCA 38 and may include a second optical connector 43B adapted to be accepted by the second optical interface 42B of the CCA 38. The second optical connector 43B may a standard optical connector type, for example, a Corning® Unicam® SC fiber connector made by Corning Incorporated of Corning, N.Y.

It is noted that the at least one second optical fiber 40B(1) may be a single-mode or multimode optical fiber comprising, for example, silica. Other nominal diameters may also be used. The at least one second optical fiber 40B(1) may, for example, have a nominal diameter of one-hundred twenty-five (125) microns including a protective coating (not shown). The at least one second optical fiber 40B(1) may also be protected by a cable jacket (not shown). The at least one second optical fiber 40B(1) may be, for example, Corning® Clearcurve® optical fiber made by Corning Incorporated of Corning, N.Y.

As discussed above, the second opto-electrical cable 36B(1) may also include the second opto-electrical connector assembly 46B(1). The second opto-electrical connector assembly 46B(1) may be configured to carry the signals between the first end 48B(1) of the at least one second optical fiber 40B(1) and the second electrical interface 44B(1) of the second electrical device 32B(1). The second opto-electrical connector assembly 46B(1) may include a second opto-electrical converter 52B(1) configured to convert the signals between the optical domain compatible with the at least one second optical fiber 40B(1) and the electrical domain compatible with the second electrical interface 44B(1) of the second electrical device 32B(1). The second opto-electrical converter 52B(1) may comprise, for example, at least one VCSEL, DFB laser, DBR laser, avalanche diodes, and/or p-i-n diodes (not shown). The second opto-electrical converter 52B(1) may also comprise at least one electrical-to-optical (E-O) converter (not shown) to convert signals in the electrical domain from the second electrical interface 44B(1) to signals in the optical domain to be transferred to the at least one second optical fiber 40B(1). The second opto-electrical converter 52B(1) may include at least one optical-to-electrical (O-E) converter to convert the signals in the optical domain from the second optical fiber 40B(1) into signals in the electrical domain to be transferred to the second electrical interface 44B(1). In one embodiment, for example, the at least one second opto-electrical converter 52B(1) may include VCSEL sources with p-i-n diode photodiodes detectors, and an LC duplex optical connector as an optical interconnection. It is noted that DFB or DBR lasers could be used, for example, instead of VCSEL lasers. Also, avalanche photodiodes could be used instead of p-i-n diodes.

With continued reference to FIG. 2, the second opto-electrical connector assembly 46B(1) of the second opto-electrical cable 36B(1) may include at least one second electrical conductor input 54B(1) and at least one second electrical conductor output 56B(1) to engage and exchange the signals in the electrical domain with the second electrical interface 44B(1) of the second electrical device 32B(1). The second electrical conductor input 54B(1) may also provide power from the second electrical interface 44B(1) of the second electrical device 32B(1) to enable the operation of the second opto-electrical converter 52B(1).

It is noted that the second optical interface 42B(1) may also interconnect a standard fiber optic cable optically connecting to an electrical device (not shown) having an optical interface. In this way, electrical devices with optical interfaces are compatible with the CCA 38. In this manner, a combination of electrical devices having electrical interfaces and electrical devices having optical interfaces may also be connected via the CCA 38.

Figure 3A:
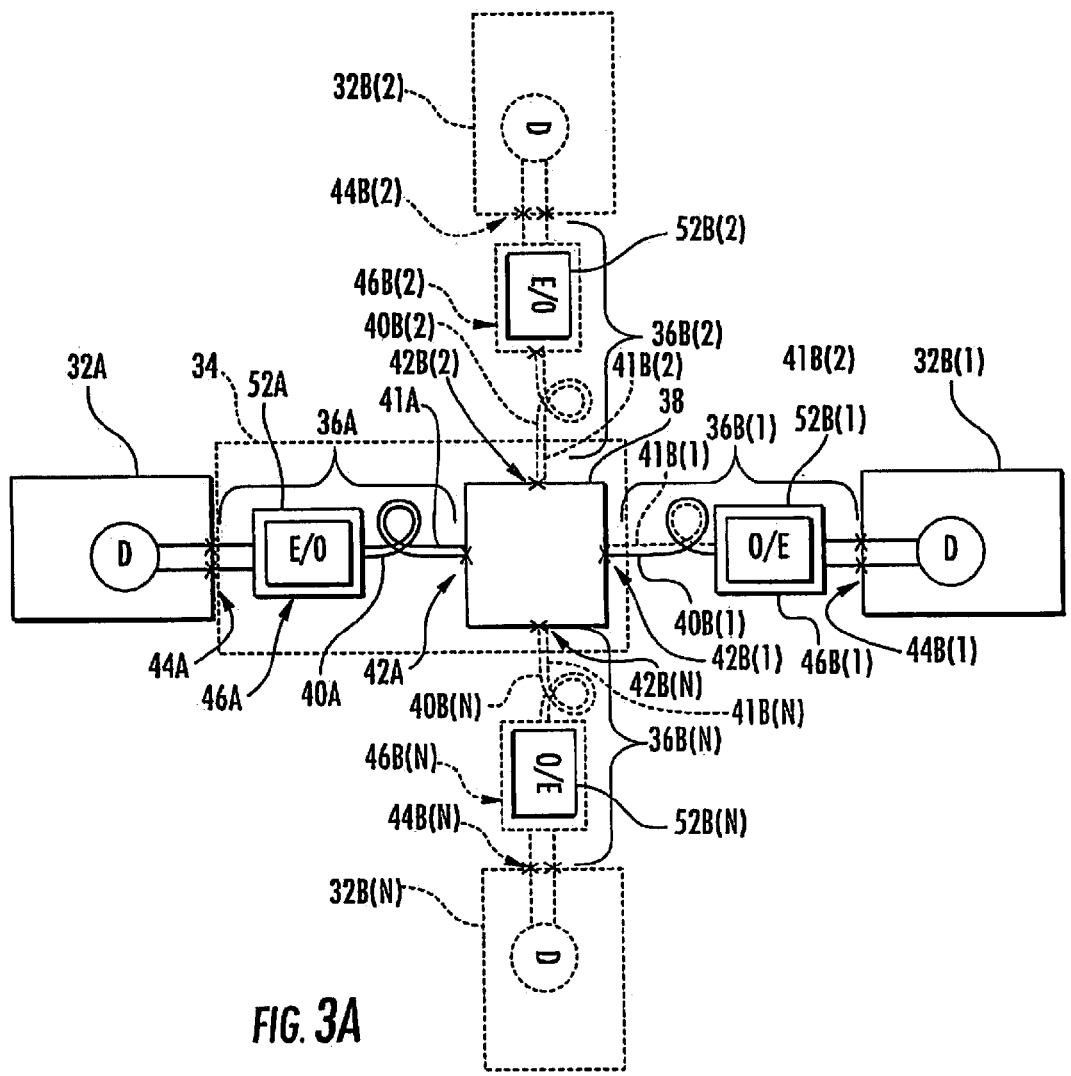
FIGS. 3A-3D are schematic diagrams of the electrical device and the opto-electrical connection system of FIG. 2 being connected to at least one second electrical device through at least one second opto-electrical cable, illustrating that the CCA of the opto-electrical connection system of FIG. 2 allows for multiple exemplary opto-electrical connectivity configurations.
Figure 3B:
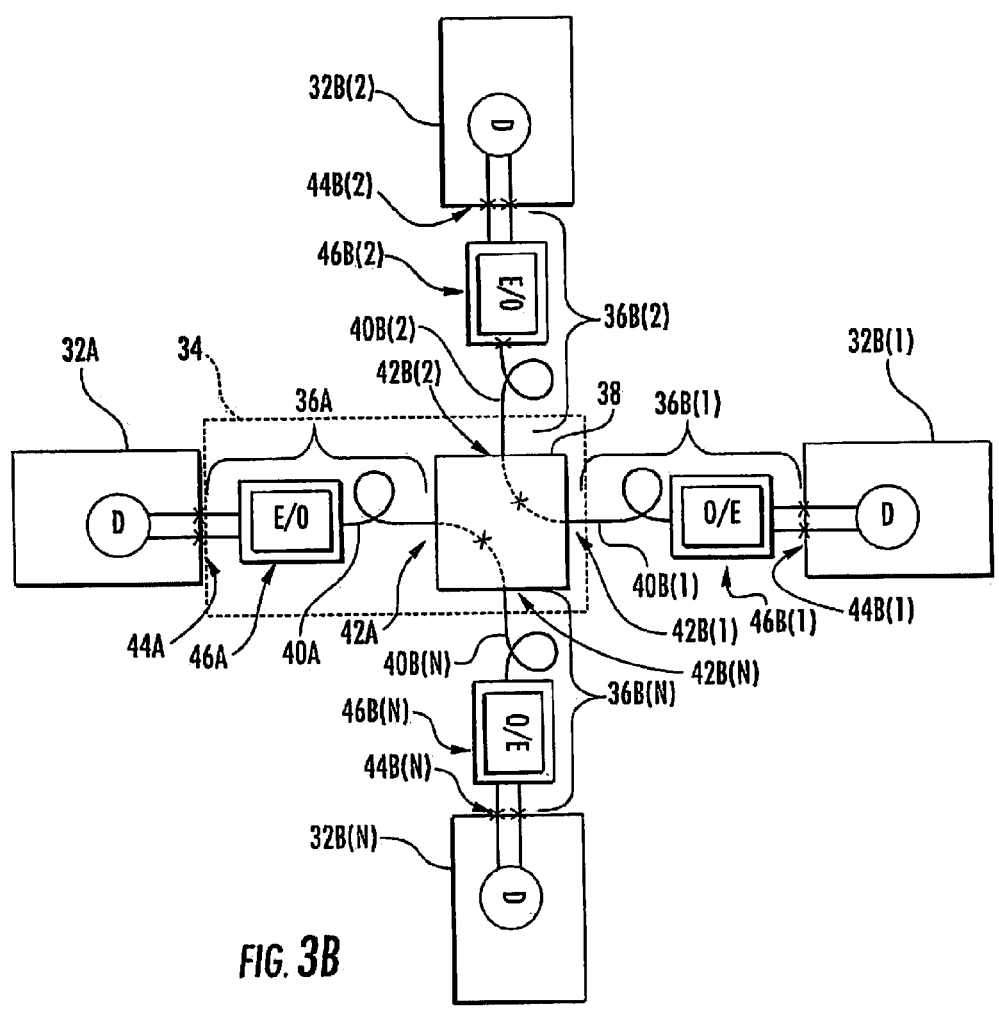
Figure 3C:
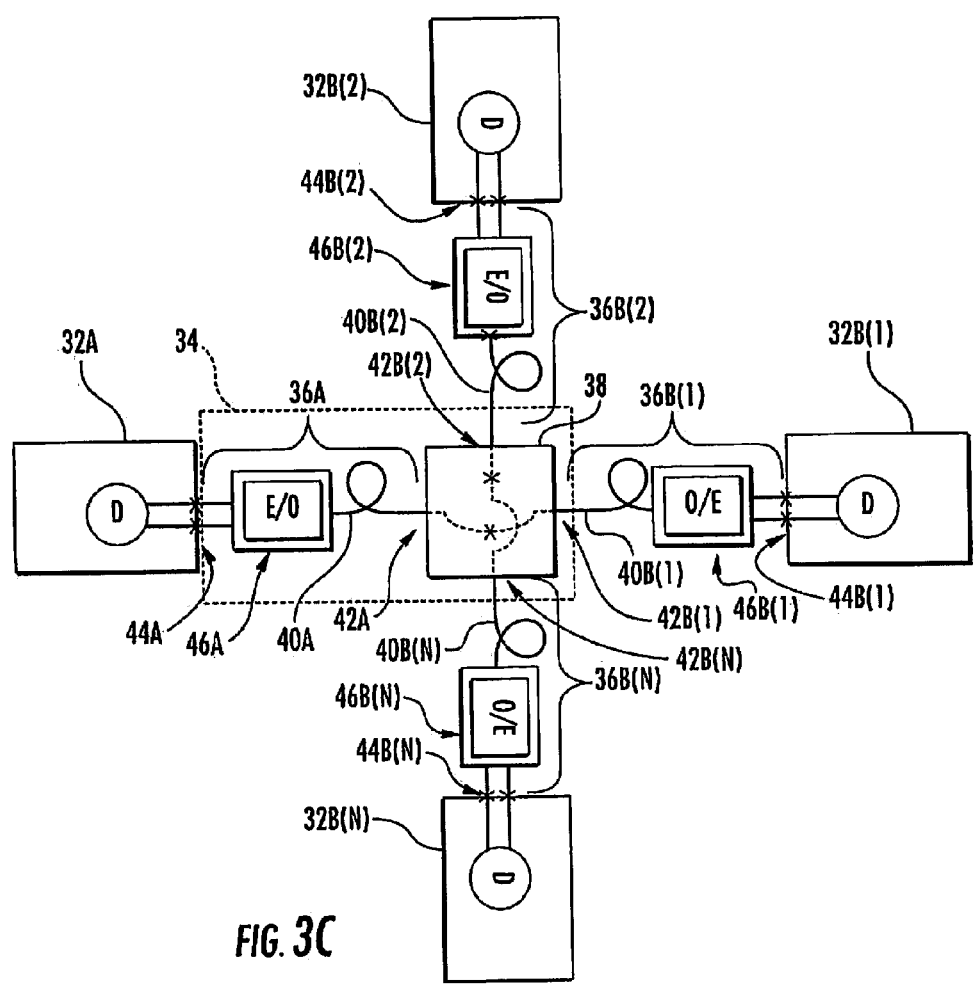
Figure 3D:
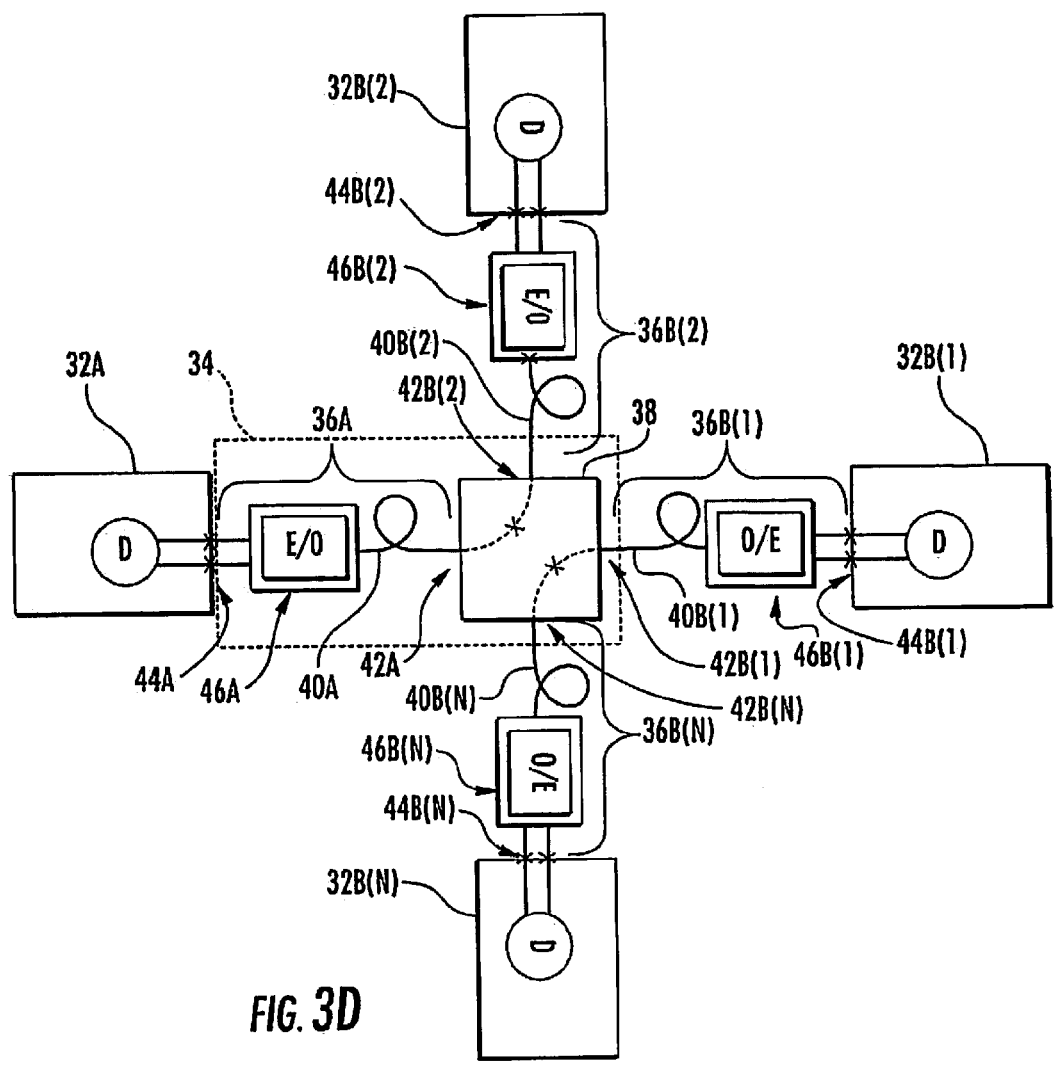

Now that details of the second optical interface 42B(1) of the CCA 38 have been introduced, FIGS. 3A-3D depict different exemplary configuration embodiments provided by the CCA 38 to thereby illustrate functionality of the CCA 38. FIGS. 3A-3D show that the CCA 38 may include the at least one second optical interfaces 42B(1)-42B(N) where the second opto-electrical cables 36B(1)-36B(N) interconnect, respectively, providing connectability between the second electrical devices 32B(1)-32B(N) and the CCA 38. FIG. 3A shows that the CCA 38 may provide connectability between the electrical device 32A and the second electrical device 32B(1), the second electrical device 32B(2), and/or the second electrical device 32B(N). The opto-electrical cable 36A may also comprise an optional electrical power wire 41A and the second opto-electrical cables 36B(1)-36B(N) may also comprise second optional power wires 41B(1)-41B(N). The optional electrical power wire 41A and the second optional power wire 41B(1)-41B(N) may electrically couple the opto-electrical assembly 46A and the second opto-electrical assemblies 46B(1)-46B(N), respectively, with the CCA 38. In this manner, power may be distributed throughout all opto-electrical cables to support conversion of the signals between the optical and electrical domains.

In another configuration depicted in FIG. 3B, the CCA 38 may provide connectability between the electrical device 32A and the second electrical device 32B(N), and between the second electrical device 32B(1) and the second electrical device 32B(2). In yet another configuration depicted in FIG. 3C, the CCA 38 may provide connectability between the electrical device 32A and the second electrical device 32B(1), and between the second electrical device 32B(2) and the second electrical device 32B(N). FIG. 3D depicts another configuration wherein the CCA 38 provides connectivity between the electrical device 32A and the second electrical device 32B(2), and also between the second electrical device 32B(1) and the second electrical device 32B(N). In this manner, the CCA 38 may serve as a switching apparatus for creating different connection configurations as needed. In practice, the electrical device 32A and the second electrical devices 32B(1)-32B(N) may serve different functions. For example, the electrical device 32A may be an internet subscriber box from an internet service provider, the second electrical device 32B(1) may be an entertainment unit for a television, the second electrical device 32B(2) may be a computer requiring internet access, and the second electrical device 32B(N) may be an internet-enabled home appliance, for example, an internet-enabled thermostat. Each of the second electrical devices 32B(1), 32B(2), 32B(N) and the electrical device 32A may be connected as directed through the CCA 38 of the opto-electrical connection system 34. In this way, high bandwidth connectivity which is highly-configurable may be provided to any electrical device using opto-electrical cables to deliver services to users utilizing the electrical devices when desired.

Figure 4:
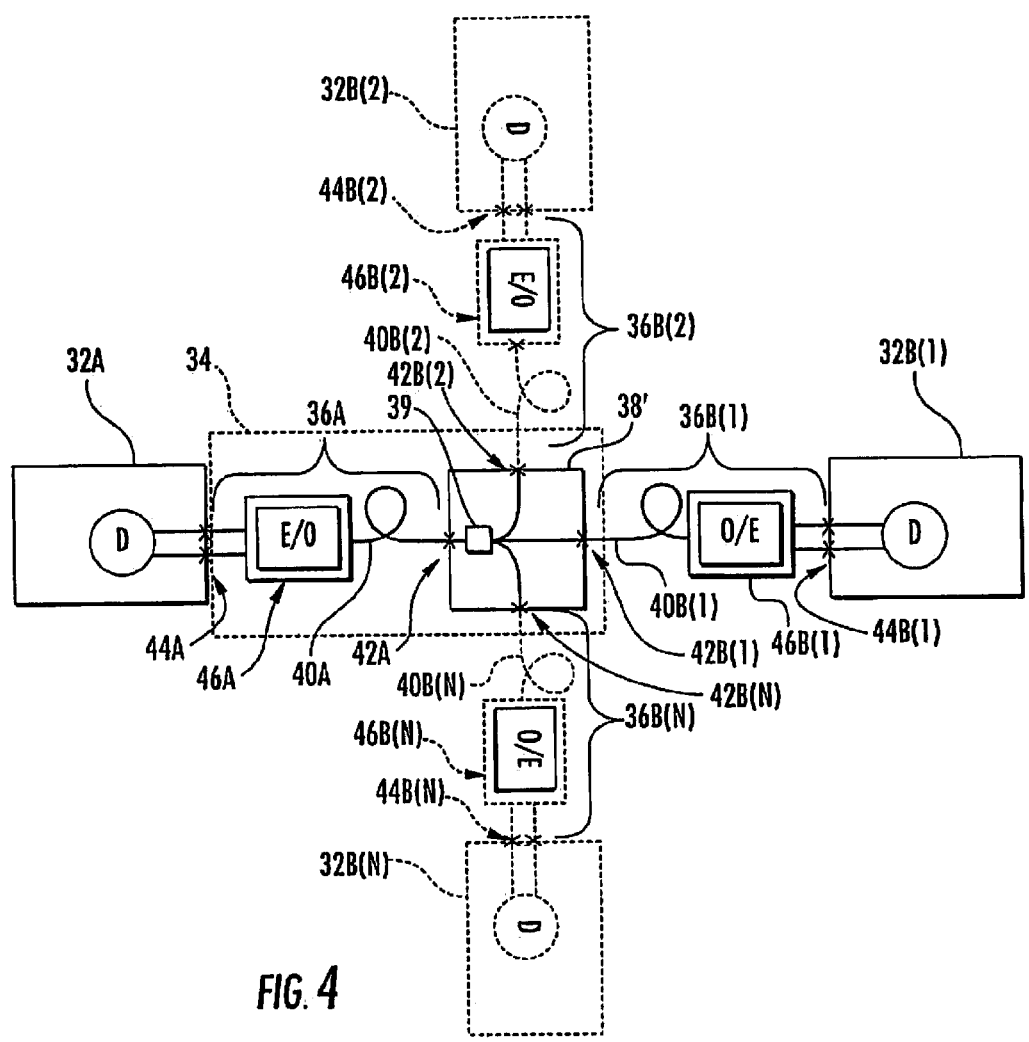
FIG. 4 is a schematic diagram of the electrical device and the opto-electrical connection system of FIG. 3A having an optical splitter, illustrating that the opto-electrical system allows for optical splitting.

FIG. 4 is a schematic diagram of the electrical device 32A and the second electrical devices 32B(1)-32B(N) being interconnected by a CCA 38' which is another embodiment of the CCA 38. Unlike the CCA 38, the CCA 38' may include an optical splitter 39 which may split the signals from the opto-electrical cable 36A and be interconnected to the second opto-electrical cables 36B(1)-36B(N) which may carry the split signals to the second electrical devices 32B(1)-32B(N). The optical splitter 39 may be configured to handle upstream signals that would have contention on them by, for example, accepting upstream signals based on a control signal or other de-multiplexing methods.

Figure 5A:
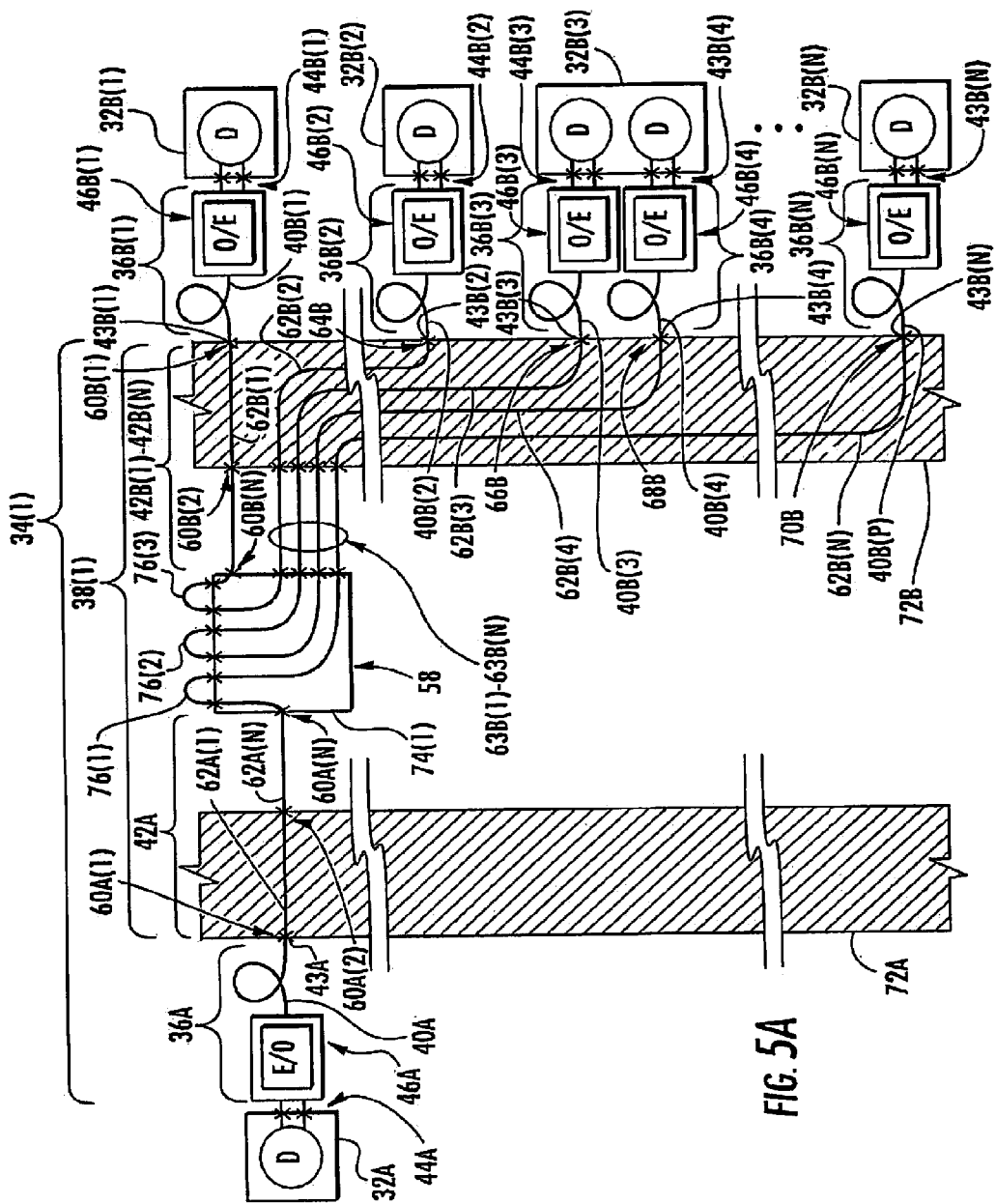

FIG. 5A depicts a CCA 38(1) of the opto-electrical connection system 34(1), which is one embodiment of the CCA 38 to illustrate how the CCA 38 may provide connectivity between the electrical device 32A and the at least one second electrical devices 32B(1)-32B(N). As similarly discussed above, the opto-electrical connection system 34(1) may include the opto-electrical cable 36A and the configurable connection assembly 38(1). It is also noted that the CCA 38(1) may provide connectability between the second electrical devices 32B(1)-32B(N).

The CCA 38(1) may include the optical interface 42A, the at least one second optical interface 42B(1)-42B(N), and at least one configurable connection device 58. The details of each of these are now discussed sequentially with reference to FIG. 5A.

The optical interface 42A may be adapted to accept the optical connector 43A of the at least one optical fiber 40A of the opto-electrical cable 36A. In this manner, signals may pass between the electrical device 32A and the CCA 38(1) through the opto-electrical cable 36A. FIG. 5A shows one embodiment of the at least one optical interface 42A which may include at least one optical port 42A(1)-42A(2). The at least one optical port 42A(1)-42A(2) may be, for example, at least one wall plate mounted in at least one wall 72A and/or an optical port 42A(N) adjacent to the at least one configurable connection device 58. The at least one optical port 42A(1)-42A(N) may include the plug (not shown) or the receptacle (not shown) to facilitate the optical connection with the at least one configurable connection device 58. The plug or receptacle may a standard optical connector type, for example, a SC-type optical connector as discussed above.

A cable management structure 60A may also be provided to interface the optical interface 42A to the configurable connection device 58. For example, the cable management structure 60A may include at least one trunk cable 62A(1)-62A(N) to interconnect the opto-electrical cable 36A to the at least one configurable connection device 58. The trunk cables 62A(1)-62A(N) may be of a conventional configuration including at least one optical fiber (not shown) between optical end connectors to enable optical connections. It is noted that to reduce optical loss by reducing the number of optical connectors, the cable management structure 60A may alternatively merely include the optical port 42A(N) adjacent to the at least one configurable connection device 58 and optically connected to the optical fiber 40A of the opto-electrical cable 36A. The details of the cable management structure 60A of the CCA 38(1) have now been introduced.

Alternatively, note that the cable management structure 60A could also include other cable management structures in addition to or in lieu of the trunk cables 62A(1)-62A(N). For example, the cable management structure 60A could include one or more jumper cables, multi-fiber trunk cables, fan-out assemblies, wall plate receptacles, and other cable management structures to provide physical support to the structured cabling components and to ease the installation of the structured cabling infrastructure.

As mentioned above, the CCA 38(1) may also include the at least one second optical interface 42B(1)-42B(N) whose details will now be discussed with continued reference to FIG. 5A. The at least one second optical interface 42B(1)-42B(N) may be adapted to accept the second optical connectors 43B(1)-43B(N) of the at least one second optical fiber 40B(1)-40B(N) of the second opto-electrical cables 36B(1)-36B(N). In this manner, signals may pass between the second electrical devices 32B(1)-32B(N) and the CCA 38(1) through the second opto-electrical cables 36B(1)-36B(N) and thereby the second electrical devices 32B(1)-32B(N) may be connected via optical fiber despite the second electrical interfaces 44B(1)-44B(N) which would in conventional configurations only be connected to copper cables.

FIG. 5A shows one embodiment of the at least one second optical interface 42B(1)-42B(N) which may include at least one second optical port 42B(1)-42B(N), at least one second optical port 64B, at least one second optical port 66B, at least one second optical port 68B, and at least one second optical port 70B, respectively, which may be, for example, a wall plate mounted in at least one second wall 72B and/or adjacent to the at least one configurable connection device 58. The second optical ports 42B(1)-42B(N), the second optical port 64B, the second optical port 66B, the second optical port 68B, and the second optical port 70B, may include the second plugs (not shown) or the second receptacles (not shown) to facilitate the optical connection with the at least one configurable connection device 58. The second plugs or the second receptacle may be a standard optical connector type, for example, SC-type optical connectors as discussed above.

A second cable management structure 60B(1)-60B(N) may also be provided to interface the second optical interface 42B(1)-42B(N) to the configurable connection device 58. The second cable management structure 60B(1)-60B(N) may include at least one second trunk cable 62B(1)-62B(N) and at least one second trunk cable 63B(1)-63B(N) to interconnect the second opto-electrical cables 36B(1)-36B(N) to the at least one configurable connection device 58. Note that the second trunk cable 63B(1)-63N(N) may be in the form of a multi-fiber trunk cable. The second trunk cables 62B(1)-62B(N) and the second trunk cables 63B(1)-63B(N) may be of a conventional configuration including at least one optical fiber (not shown) between optical end connectors at enable optical connections between optical connectors. It is noted that the second electrical device 32B(3) may be connected to the CCA 38 with two or more of the second opto-electrical cables 36B(3), 36B(4). The details of the second cable management structure 60B(1)-60B(N) of the CCA 38(1) have now been introduced.

Alternatively, note that the cable management structure 60B(1)-60B(N) could also include other cable management structures in addition to or in lieu of the trunk cables 62B(1)-62B(N) and second trunk cables 63B(1)-63B(N). For example, the cable management structure 60B could include one or more jumper cables, multi-fiber trunk cables, fan-out assemblies, wall plate receptacles, and other cable management structures to provide physical support to the structured cabling components and to ease the installation of the structured cabling infrastructure.

As mentioned above, the CCA 38(1) may also include the at least one configurable connection device 58 whose details will now be discussed with continued reference to FIG. 5A. The at least one configurable connection device 58 may receive and transmit the signals between the second end 50A (FIG. 2) of the at least one optical fiber 40A of the opto-electrical cable 36A and the at least one second optical fibers 40B(1)-40B(N) of the second opto-electrical cables 36B(1)-36B(N). In the embodiment depicted in FIG. 5A, the at least one configurable connection device 58 may be a patch panel 74(1) which may include at least one jumper cable 76(1)-76(3) to connect the electrical device 32A and the second electrical devices 32B(1)-32B(N) in a changeable configuration. In the changeable configuration depicted in FIG. 5A the opto-electrical cable 36A of electrical device 32A may be connected with the jumper cable 76(1) to the second opto-electrical cable 36B(N) of second electrical device 32B(N), the second opto-electrical cable 36B(3) of second electrical device 32B(3) may be connected with the jumper cable 76(2) to the second opto-electrical cable 36B(4) of the second electrical device 32B(3), and the second opto-electrical cable 36B(1) of second electrical device 32B(1) may be connected with the jumper cable 76(3) to the second opto-electrical cable 36B(2) of the second electrical device 32B(2). In this manner, one embodiment of a connection configuration may be created.

FIG. 5B is a schematic drawing of another embodiment of a connection configuration using the same components discussed above with FIG. 5A. However, the jumper cables 76(1)-76(3) may be rearranged, for example, manually so that the opto-electrical cable 36A of electrical device 32A may be connected with the jumper cable 76(1) to the second opto-electrical cable 36B(1) of second electrical device 32B(1), the second opto-electrical cable 36B(2) of second electrical device 32B(2) may be connected with the jumper cable 76(2) to the second opto-electrical cable 36B(3) of the second electrical device 32B(3), and the second opto-electrical cable 36B(4) of second electrical device 32B(3) may be connected with the jumper cable 76(3) to the second opto-electrical cable 36B(N) of the second electrical device 32B(N). In this manner, another connection configuration may be created wherein information may be exchanged between electrical devices as required through high bandwidth and low power consumption optical fibers.

Figure 5C:
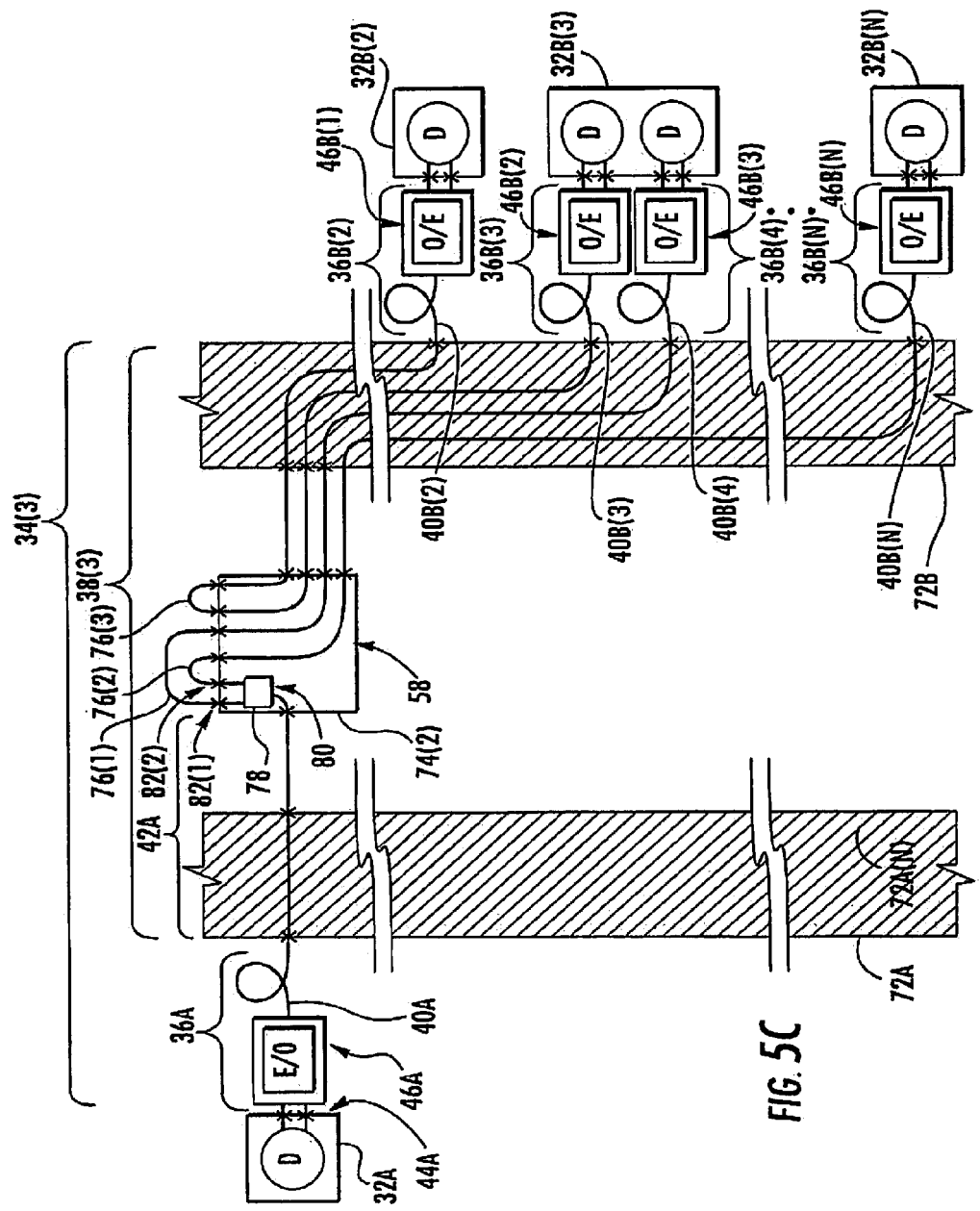
FIG. 5C is a schematic diagram of the electrical device of FIG. 2 being connected by another opto-electrical connection system including an optical splitter of a patch panel, illustrating another connectivity configuration embodiment of the opto-electrical connection system.

FIG. 5C is a schematic drawing of yet another embodiment of an connection configuration using many, but not all of the components discussed above with FIG. 5A. Instead, the patch panel 74(1) of the at least one configurable connection device 58 of FIG. 5A may be replaced with a patch panel 74(2) which includes at least one optical splitter 78. The optical splitter 78 of the patch panel may split the signal in the optical domain from the opto-electrical cable 36A and/or the second opto-electrical cable 36B(1)-36B(N) into multiple optical paths. For example, FIG. 5C depicts the at least one optical fiber 40A may be optically connected into an input port 80 of the optical splitter 78. The jumper cable 76(1), 76(2) may optically connect to the output ports 82(1), 82(2), respectively, of the optical splitter 78. In this manner, another configuration may be created wherein the opto-electrical cable 36A of electrical device 32A may be connected with the jumper cable 76(1) to the second opto-electrical cable 36B(4) of second electrical device 32B(3), the opto-electrical cable 36A of electrical device 32A may be connected with the jumper cable 76(2) to the second opto-electrical cable 36B(N) of second electrical device 32B(N), and the second opto-electrical cable 36B(2) of second electrical device 32B(2) may be connected with the jumper cable 76(3) to the second opto-electrical cable 36B (3) of second electrical device 32B(3). It is noted that second opto-electrical cable 36B(1) and the second electrical device 32B(1) have been removed from FIG. 5C for conciseness, because they were not connected to the patch panel 74(2) in this example.

Other embodiments are possible. FIG. 6A is a schematic diagram of the electrical device 32A of FIG. 2 being connected by another embodiment of the opto-electrical connection system 34(4) including the patch panel 74(1) of FIG. 5A, illustrating another configuration connectivity embodiment of the opto-electrical connection system 34. Unlike previous embodiments discussed above, the configurable connection device 58 of the opto-electrical connection system 34(4) may further comprise a plurality of third opto-electrical cables 84(1), 84(2) and a matrix switch 86(1). The matrix switch 86(1) may be configured to selectably connect one or more of the plurality of ports 88(1), 88(2) of the matrix switch 86(1) to allow signals in the electrical domain to be exchanged between the one or more of the plurality of ports 88(1), 88(2) of the matrix switch 86(1). The matrix switch 86(1) may, for example, be instructed to create a configurable connection at the ports 88(1), 88(2) through copyright protection schemes embedded in software within the matrix switch 86(1) or may receive instructions via a separate control signal (not shown).

With continuing reference to FIG. 6A, the at least one third optical fibers 90(1), 90(2) of the third opto-electrical cables 84(1), 84(2) may be through third opto-electrical connector assemblies 92(1), 92(2), respectively, electrically coupled to the plurality of ports 88(1), 88(2) of the matrix switch 86(1) and optically connected to the second optical interfaces 42B(4), 42B(N), respectively. In this manner, another configuration may be created wherein the opto-electrical cable 36A of electrical device 32A may be connected with the jumper cable 76(1) to the second opto-electrical cable 36B(3) of second electrical device 32B(3), the second opto-electrical cable 36B(1) of second electrical device 32B(1) may be connected with the jumper cable 76(2) to the second opto-electrical cable 36B(2) of second electrical device 32B(2), and the second opto-electrical cable 36B(4) of second electrical device 32B(3) may be connected with the matrix switch 86(1) to the second opto-electrical cable 36B(N) of second electrical device 32B(N).

It is also noted that the configurable connection device 58 may comprise an electrical interface 93 adapted to electrically couple to an electrical cable 95 which may be electrically coupled to an electrical device 97 with an electrical interface 99. The advantage of the configurable connection device 58 approach may be that it is possible to mix electrical and optical cables in an interconnection configuration.

Figure 6B:
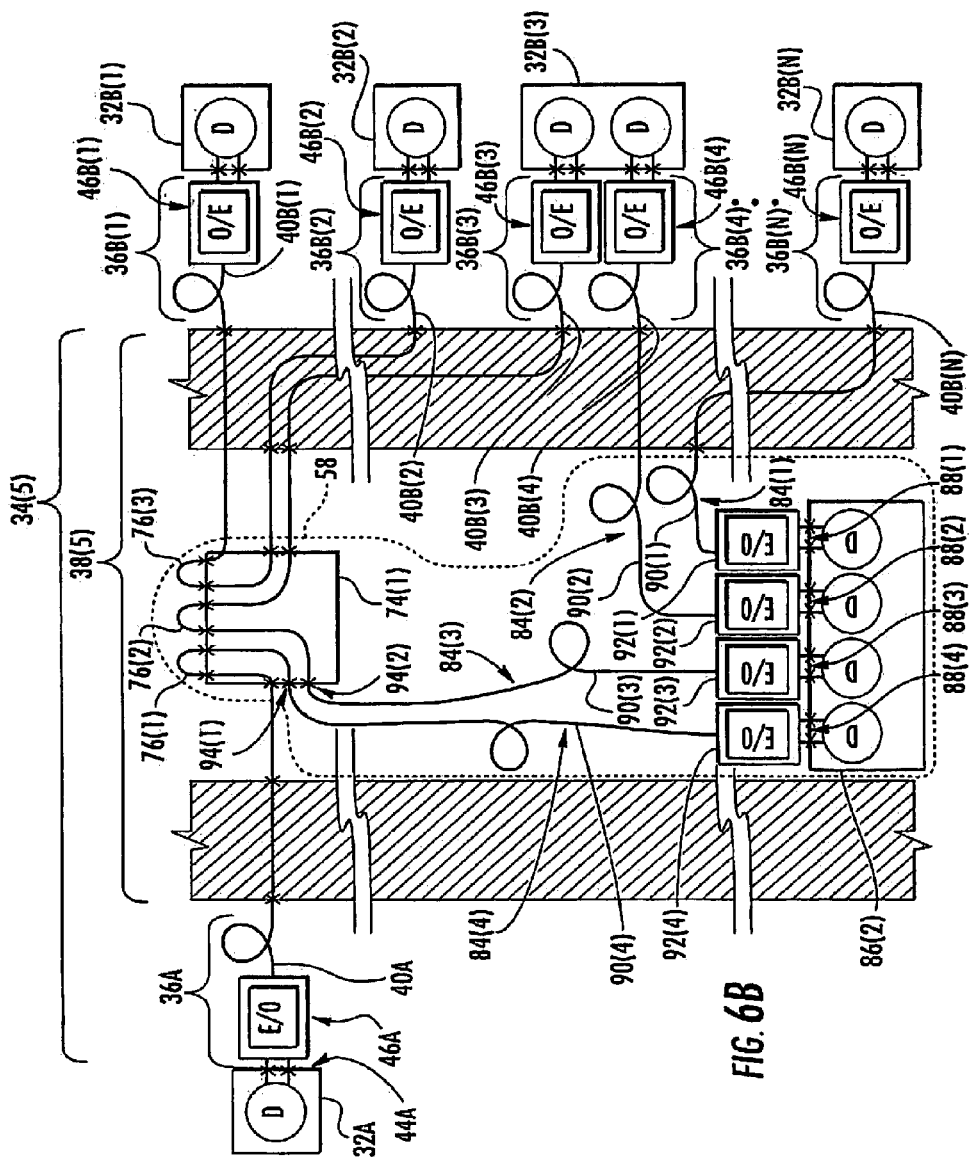
FIG. 6B is a schematic diagram of the electrical device of FIG. 2 being connected by another opto-electrical connection system including the patch panel of FIG. 5A and the matrix switch having a portion of a plurality of ports of the matrix switch connected to the patch panel, illustrating another connectivity configuration embodiment of the opto-electrical connection system.

FIG. 6B is a schematic diagram of the electrical device 32A of FIG. 2 being instead connected by a CCA 38(5) of an opto-electrical connection system 34(5). The opto-electrical connection system 34(5) may be another configurable connectivity embodiment of the opto-electrical connection system 34 providing additional flexibility and control to create more capable connection configurations between the electrical device 32A and the second electrical devices 32B(1)-32B(N).

The CCA 38(5) may include the configurable connection device 58 comprising the patch panel 74(1) of FIG. 5A and a matrix switch 86(2) connected to the patch panel 74(1). The CCA 38(5) may be similar to the CCA 38(4) depicted in FIG. 6A and so for clarity and conciseness, only details of the differences will be discussed. Specifically, the at least one configurable connection device 58 of the CCA 38(5)

may include third opto-electrical cables 84(3), 84(4) including third opto-electrical connector assemblies 92(3), 92(4) and at least one third optical fibers 90(3), 90(4). The third opto-electrical connector assemblies 92(3), 92(4) may be electrically coupled with ports 88(3), 88(4), respectively, of the matrix switch 86(2) and the third optical fibers 90(3), 90(4) may be optically connected to ports 94(1), 94(2) of the patch panel 74(1). The result of these connections is that another configuration may be created wherein the opto-electrical cable 36A of electrical device 32A may be connected with the jumper cable 76(1) to the port 88(4) of the matrix switch 86(2), the second opto-electrical cable 36B(3) of the second electrical device 32B(3) may be connected with the jumper cable 76(2) to the port 88(3) of matrix switch 86(2), the second opto-electrical cable 36B(1) of second electrical device 32B(1) may be connected with the jumper cable 76(3) to the second opto-electrical cable 36B(2) of second electrical device 32B(2), the second opto-electrical cable 36B(4) of second electrical device 32B(3) may be optically connected with to the port 88(2) of the matrix switch 86(2), and the second opto-electrical cable 36B(N) of second electrical device 32B(N) may be optically connected with to the port 88(1) of the matrix switch 86(2). As the electrical device 32A and the second electrical devices 32B(3), 32B(N) are connected to the matrix switch 86(2), they may be connected by the matrix switch 86(2) as needed by the user.

FIG. 6C is a schematic diagram of the electrical device 32A of FIG. 2 being instead connected by a CCA 38(6) of an opto-electrical connection system 34(6). The opto-electrical connection system 34(6) may be another configurable connectivity embodiment of the opto-electrical connection system 34 providing additional flexibility and control to create more flexible connection configurations between the electrical device 32A and the second electrical devices 32B(1)-32B(N). In order to provide maximum flexibility, the third opto-electrical cables 84(1), 84(2) are optically connected to the patch panel 74(1). In this manner, all of the ports 88(1)-88(4) of the matrix switch 86(2) may be interconnected with the patch panel 74(1). Consequently, the opto-electrical cable 36A may be optically connected through jumper cable 76(1) to port 88(4) of the matrix switch 86(2), the second opto-electrical cable 36B(3) may be optically connected through jumper cable 76(2) to port 88(3) of the matrix switch 86(2), the second opto-electrical cable 36B(4) may be optically connected through jumper cable 76(3) to port 88(2) of the matrix switch 86(2), the second opto-electrical cable 36B(N) may be optically connected through jumper cable 76(4) to port 88(1) of the matrix switch 86(2), and the second opto-electrical cables 36B(1), 36B(2) may be optically interconnected through jumper cable 76(5). In this manner, the most flexibility to create interconnection configurations is achieved by providing an appearance of each port of the matrix switch on the patch panel to permit any opto-electrical cable to be connected by one or more of the jumper cables 76(1)-76(5).

Figure 7A:
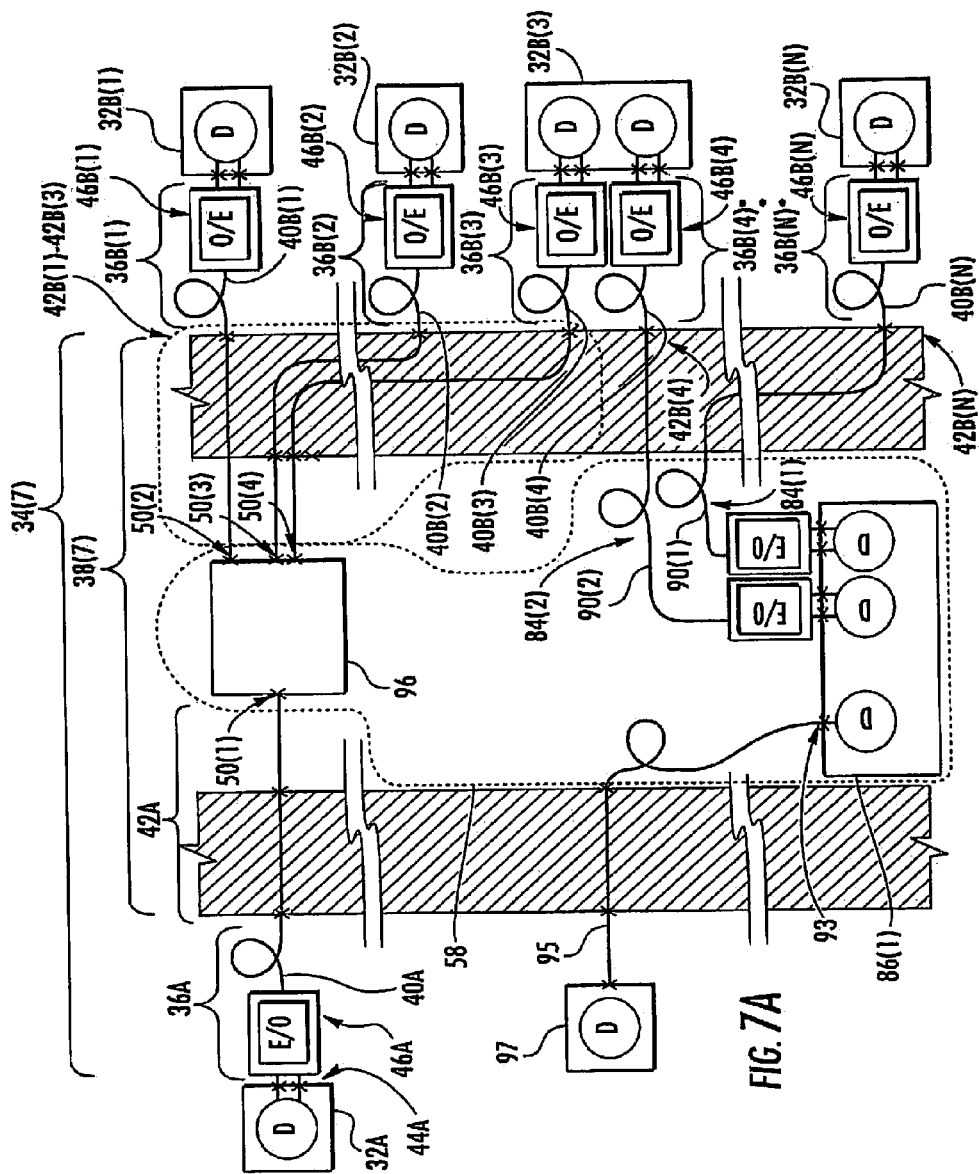
FIG. 7A is a schematic diagram of the electrical device of FIG. 2 being connected by another opto-electrical connection system including an optical switch and the matrix switch of FIG. 6A, illustrating another connectivity configuration embodiment of the opto-electrical connection system.

FIG. 7A is a schematic diagram of the electrical device 32A of FIG. 2 being connected by a CCA 38(7) of an opto-electrical connection system 34(7). The opto-electrical connection system 34(7) may be another embodiment of the opto-electrical connection system 34 providing additional flexibility and control to create more complex connection configurations between the electrical device 32A and the second electrical devices 32B(1)-32B(N). The CCA 38(7) may include the matrix switch 86(1) of FIG. 6A and an optical switch 96 instead of the patch panel 74(1) of FIG. 6A. The CCA 38(7) may be similar to the CCA 38(4) depicted in FIG. 6A and so details of the differences only will be discussed to reduce redundancy and provide conciseness.

Specifically, the electrical device 32A may be optically connected to the optical switch 96 through the opto-electrical cable 36A and the optical interface 42A. The second electrical devices 32B(1)-32B(3) may be optically connected to the optical switch 96 through the second opto-electrical cables 36B(1)-36B(3) and the second optical interfaces 42B(1)-42B(3). In this manner, the electrical device 32A and the second electrical devices 32B(1)-32B(3) may be connected without an inconvenience of manually reconfiguring the jumper cables 76(1)-76(3).

Figure 7B:
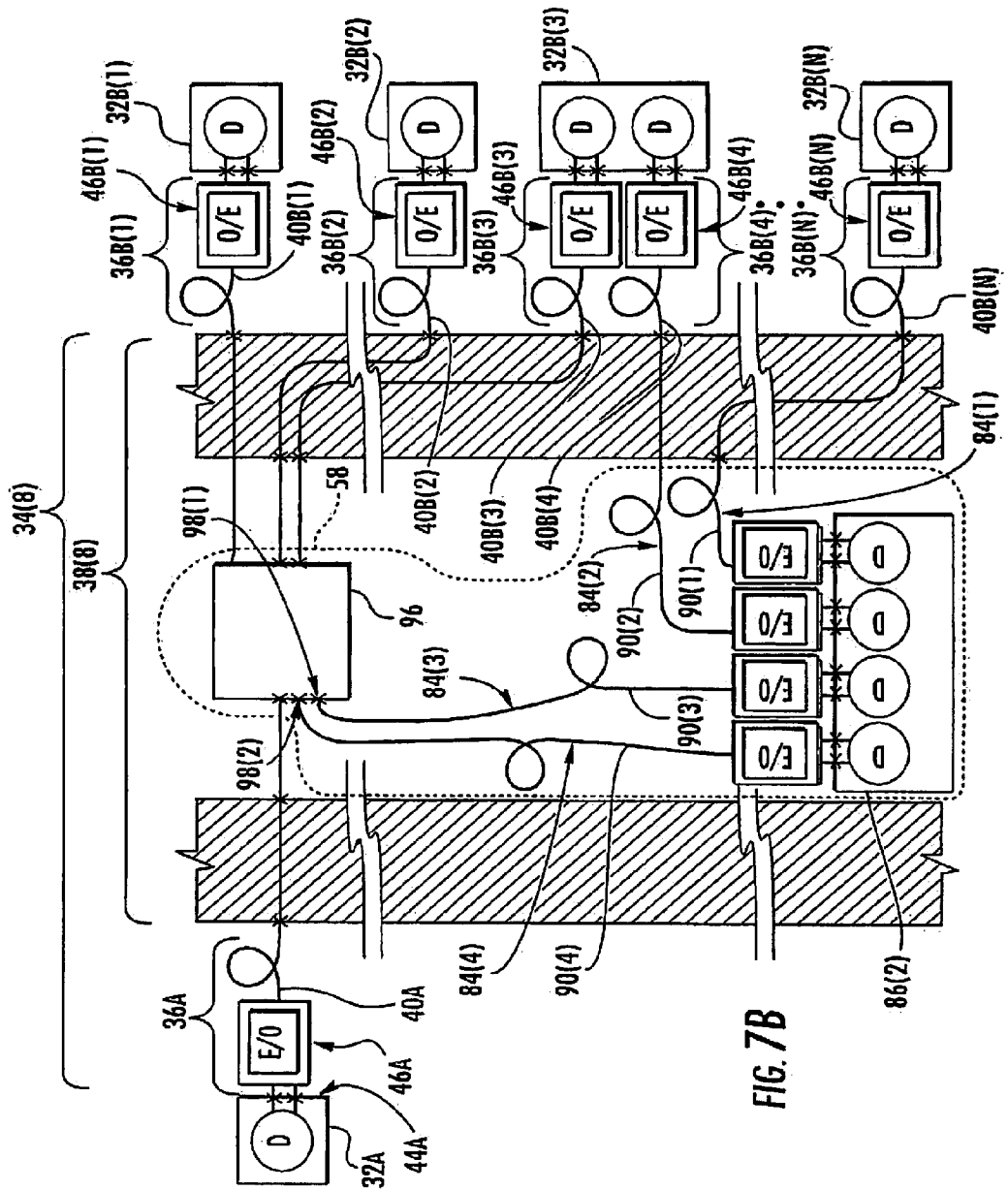
FIG. 7B is a schematic diagram of the electrical device of FIG. 2 being connected by another opto-electrical connection system including an optical switch and a matrix switch having a portion of a plurality of ports of the matrix switch connected to the optical switch, illustrating another connectivity configuration embodiment of the opto-electrical connection system.

FIG. 7B is a schematic diagram of the electrical device 32A of FIG. 2 being instead connected by a CCA 38(8) of an opto-electrical connection system 34(8). The opto-electrical connection system 34(8) may be another embodiment of the opto-electrical connection system 34 which provides additional flexibility and control to create more complex connection configurations between the electrical device 32A and the second electrical devices 32B(1)-32B(N). The CCA 38(8) may include the matrix switch 86(2) of FIG. 6B and the optical switch 96 of FIG. 7A. The CCA 38(8) may be similar to the CCA 38(5) depicted in FIG. 6B and the CCA 38(7) depicted in FIG. 7A and so details of the differences only will be discussed to reduce redundancy and improve conciseness.

The main differences between the opto-electrical connection system 34(8) in FIG. 7B and the opto-electrical connection system 34(5) of FIG. 6B is that the patch panel 74(1) is replaced by the optical switch 96 and the at least one third optical fibers 90(3), 90(4) of the third opto-electrical cables 84(3), 84(4) may be interconnected at ports 98(1), 98(2), respectively, of optical switch 96.

There are advantages to this configuration depicted in FIG. 7B because any of the opto-electrical cable 36A and the second opto-electrical cables 36B(1)-36B(N) may be selectively connected. Specifically, the optical switch 96 may selectively connect any one of the opto-electrical cable 36A and the second opto-electrical cable 36B(1)-36B(3) to each other and through the ports 98(1), 98(2) to the matrix switch 86(2). The matrix switch 86(2) may selectively connect the second opto-electrical cables 36B(4), 40B(N) to each other and through the third opto-electrical cables 84(3), 84(4) to the ports 98(1), 98(2) of the optical switch 96. As such, full connectability between the electrical device 32A and the second electrical devices 32B(1)-32B(N) may be achieved with the opto-electrical connection system 34(8) and thereby provide high bandwidth connection for signal transfer with full configurable capability.

Figure 7C:
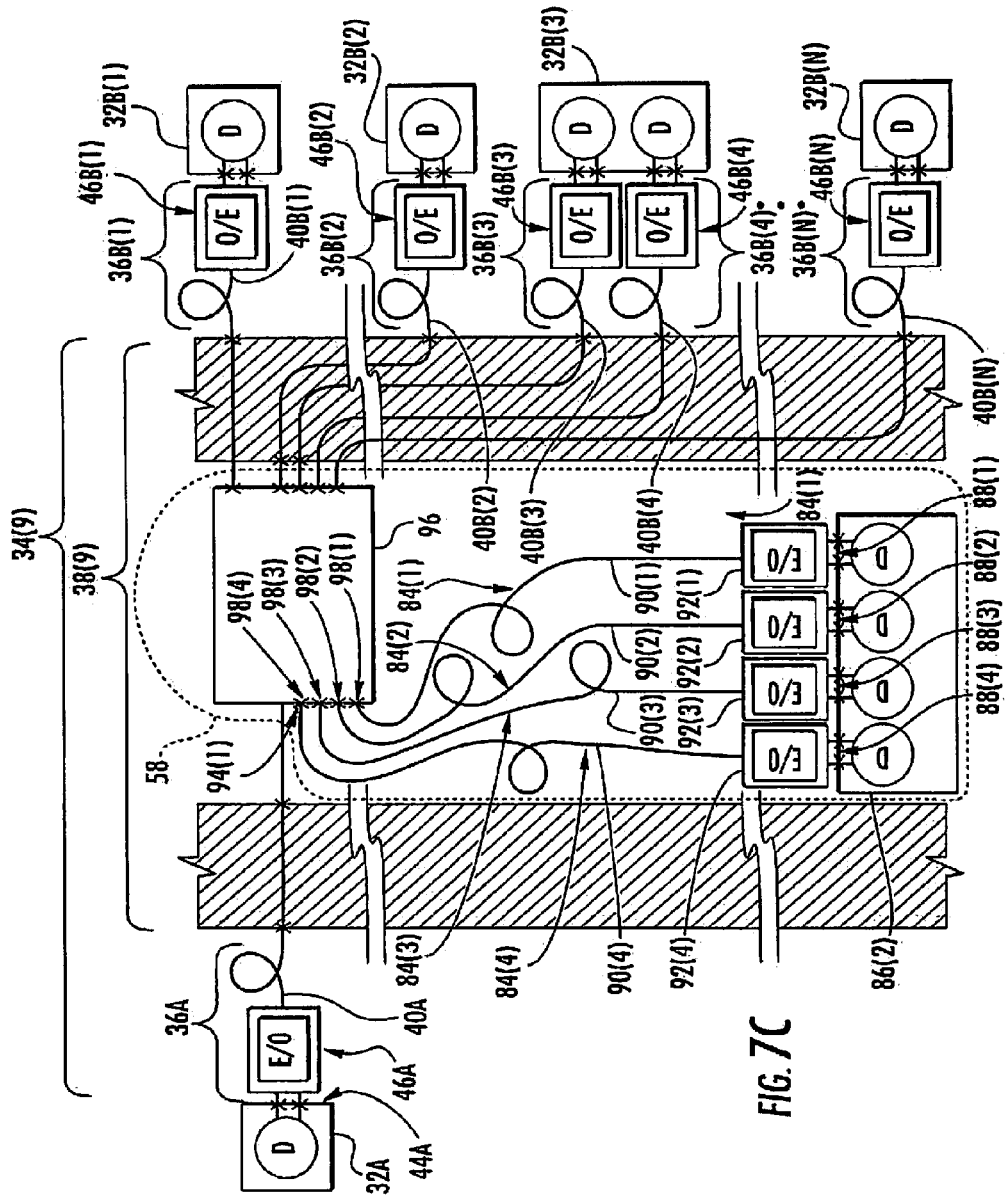
FIG. 7C is a schematic diagram of the electrical device of FIG. 2 being connected by another opto-electrical connection system including the optical switch and the matrix switch having the plurality of ports of the matrix switch connected to the optical switch, illustrating another connectivity configuration embodiment of the opto-electrical connection system.

FIG. 7C is a schematic diagram of the electrical device 32A of FIG. 2 being connected by a CCA 38(9) of an opto-electrical connection system 34(9). The opto-electrical connection system 34(9) may be another embodiment of the opto-electrical connection system 34 which provides additional flexibility and control to create more complex connection configurations between the electrical device 32A and the second electrical devices 32B(1)-32B(N). The CCA 38(9) may include the matrix switch 86(2) of FIG. 6B and the optical switch 96 of FIG. 7A. The CCA 38(9) may be similar to the CCA 38(8) depicted in FIG. 7B and so details of the differences only will be discussed to reduce redundancy and improve conciseness. In this case, all the third opto-electrical cables 84(1)-84(4) are interconnected with the optical switch 96. As the optical switch 96 may interconnect any of the opto-electrical cable 36A or second opto-electrical cable 36B(1)-36B(N) with the ports 88(1)-

88(4) of the matrix switch 86(2), then maximum flexibility is achieved because the matrix switch 86(2) may use software and/or electronics to more conveniently manage the signals carried by it compared with the patch panel 74(1) which may require manual operation by a user.

Some high-level guidelines may be learned from the configurations discussed above. First, when every opto-electrical cable is connected to the matrix switch 86, and there is no patch panel 74, then there is complete configuration flexibility, which may be electronically controlled through the matrix switch 86. Further, every matrix switch port has EO cable assemblies that pass through the patch panel, even if not every EO cable assembly has access to the matrix switch. This gives complete flexibility, although some of it is controlled manually through the patch panel, and some of it may be electronically controlled through the matrix switch.

As used herein, it is intended that terms "fiber optic cables" and/or "optical fibers" include all types of single-mode and multimode light waveguides, including one or more optical fibers that may be upcoated, colored, buffered, ribbonized and/or have other organizing or protective structure in a cable such as one or more tubes, strength members, jackets or the like. The optical fibers disclosed herein can be single-mode or multimode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. An opto-electrical connection system, comprising:
   an opto-electrical cable comprising
      at least one optical fiber including a first end and a second end opposite the first end configured to carry signals in an optical domain between the first end and the second end,
      at least one optical connector at the second end of the at least one optical fiber, and
      an opto-electrical connector assembly having an opto-electrical converter configured to convert the signals between the optical domain and an electrical domain, the opto-electrical converter is configured to carry the signals between an electrical interface of an electrical device and the first end of the at least one optical fiber; and
   a configurable connection assembly (CCA) comprising
      an optical interface accepting the at least one optical connector of the at least one optical fiber of the opto-electrical cable,
      at least one second optical interface adapted to accept at least one second optical connector of at least one second optical fiber of at least one second opto-electrical cable,
      a configurable connection device to interconnect the signals between the second end of the at least one optical fiber of the opto-electrical cable and the at least one second optical fiber of the at least one second opto-electrical cable, and
      a plurality of third opto-electrical cables and a matrix switch, wherein the plurality of third opto-electrical cables are electrically coupled to a plurality of ports of the matrix switch and optically connected to at least one of the optical interface and the at least one second optical interface.

2. The opto-electrical connection system according to claim 1, further comprising a patch panel optically connected to the optical interface and the at least one second optical interface.

3. The opto-electrical connection system according to claim 2, wherein the patch panel comprises an optical splitter optically connected to the optical interface cable and the at least one second optical interface.

4. The opto-electrical connection system according to claim 2, wherein the patch panel comprises at least one patch panel cord to optically connect the optical interface and the at least one second optical interface.

5. The opto-electrical connection system according to claim 2, wherein the patch panel is optically connected to the optical interface with at least one optical fiber jumper cable.

6. The opto-electrical connection system according to claim 2, wherein the matrix switch is optically connected to the patch panel via at least one third opto-electrical cable.

7. The opto-electrical connection system according to claim 6, wherein the matrix switch is configured to selectably connect one or more of the plurality of ports of the matrix switch to allow signals in the electrical domain to be exchanged between one or more of the plurality of ports of the matrix switch.

8. The opto-electrical connection system according to claim 1, wherein the matrix switch is configured to selectably connect one or more of the plurality of ports of the matrix switch to allow signals in the electrical domain to be exchanged between one or more of the plurality of ports of the matrix switch.

9. The opto-electrical connection system according to claim 1, further comprising an optical switch including a second plurality of ports optically connected to at least one of:
   the optical interface, and
   the at least one second optical interface,
   wherein the optical switch is configured to connect the second plurality of ports.

10. The opto-electrical connection system according to claim 1, wherein the optical interface is disposed within a wall plate.

11. The opto-electrical connection system according to claim 1, wherein the configurable connection device is configured to carry the signals between the optical interface and the at least one second optical interface without conversion between the electrical domain and the optical domain.

12. The opto-electrical connection system according to claim 1, wherein the at least one optical fiber of the opto-electrical cable comprises one optical fiber which is configured for one-way communications of the signals.

13. The opto-electrical connection system according to claim 1, wherein the at least one optical fiber of the opto-electrical cable comprises one optical fiber which is configured for two-way communications of the signals.

14. The opto-electrical connection system according to claim 1, wherein the opto-electrical connector assembly is compatible with High-Definition Multimedia Interface (HDMI) standards.

15. The opto-electrical connection system according to claim 1, wherein the at least one optical fiber of the opto-electrical cable is detachable from an opto-electrical connector assembly of the opto-electrical cable.

16. The opto-electrical connection system according to claim 1, wherein the configurable connection device comprises an optical splitter optically connected to the optical interface cable and the at least one second optical interface.

17. The opto-electrical connection system according to claim 1, wherein the configurable connection device comprises an electrical interface adapted to electrically couple to an electrical cable which is electrically coupled to an electrical device with an electrical interface.

18. The opto-electrical connection system according to claim 1, further comprising at least one cable management structure configured to interface the at least one optical interface to the configurable connection device.

19. The opto-electrical connection system of claim 18, further comprising at least one second cable management structure configured to interface the at least one second optical interface to the configurable connection device, wherein the at least one second cable management structure is selected from the group of at least one jumper cable, at least one multi-fiber trunk cable, at least one fan-out assembly, and at least one wall plate receptacle.

20. The opto-electrical connection system of claim 19, wherein the at least one second cable management structure is selected from the group of at least one jumper cable, at least one multi-fiber trunk cable, at least one fan-out assembly, and at least one wall plate receptacle.

21. A configurable connection assembly (CCA), comprising:
an optical interface adapted to accept at least one optical connector of at least one optical fiber of an opto-electrical cable;
at least one second optical interface adapted to accept at least one second optical connector of at least one second optical fiber of at least one second opto-electrical cable; and
a configurable connection device to interconnect signals in an optical domain between the at least one optical fiber of the opto-electrical cable and the at least one second optical fiber of the at least one second opto-electrical cable; and
a plurality of third opto-electrical cables and a matrix switch, wherein the plurality of third opto-electrical cables are electrically coupled to a plurality of ports of the matrix switch and optically connected to at least one of the optical interface and the at least one second optical interface.

22. The configurable connection assembly according to claim 21, further comprising a patch panel optically connected to the optical interface and the at least one second optical interface.

23. The configurable connection assembly according to claim 22, wherein the patch panel comprises an optical splitter optically connected to the optical interface cable and the at least one second optical interface.

24. The configurable connection assembly according to claim 22, wherein the patch panel comprises at least one patch panel cord to optically connect the optical interface and the at least one second optical interface.

25. The configurable connection assembly according to claim 22, wherein the patch panel is optically connected to the optical interface with at least one optical fiber jumper cable.

26. The configurable connection assembly of claim 22, wherein the matrix switch is optically connected to the patch panel via at least one third opto-electrical cable.

27. The configurable connection assembly of claim 26, wherein the matrix switch is configured to selectably connect one or more of the plurality of ports of the matrix switch to allow signals in an electrical domain to be exchanged between the one or more of the plurality of ports of the matrix switch.

28. The configurable connection assembly of claim 21, wherein the matrix switch is configured to selectably connect one or more of the plurality of ports of the matrix switch to allow signals in an electrical domain to be exchanged between the one or more of the plurality of ports of the matrix switch.

29. The configurable connection assembly of claim 21, further comprising an optical switch including a second plurality of optical switch ports optically connected to at least one of:
the optical interface and
the at least one of the second optical interface,
wherein the optical switch is configured to reversibly connect the second plurality of optical switch ports.

30. The configurable connection assembly of claim 21, wherein the optical interface is disposed within a wall plate.

31. The configurable connection assembly of claim 21, wherein the configurable connection device is configured to carry the signals between the optical interface and the at least one second optical interface without conversion between an electrical domain and the optical domain.

32. The configurable connection assembly of claim 21, wherein the at least one optical fiber of the opto-electrical cable comprises one optical fiber which is configured for one-way communications of the signals.

33. The configurable connection assembly of claim 21, wherein the at least one optical fiber of the opto-electrical cable comprises one optical fiber which is configured for two-way communications of the signals.

* * * * *